(12) United States Patent
Uhrner

(10) Patent No.: US 7,172,201 B2
(45) Date of Patent: Feb. 6, 2007

(54) SEALING RING, ESPECIALLY RADIAL SHAFT SEAL

(75) Inventor: Klaus-Jurgen Uhrner, Leingarten (DE)

(73) Assignee: Kaco GmbH & Co. KG, Heilbronn (DE)

( * ) Notice: Subject to any disclaimer, the term of this patent is extended or adjusted under 35 U.S.C. 154(b) by 17 days.

(21) Appl. No.: 10/904,430

(22) Filed: Nov. 10, 2004

(65) Prior Publication Data
US 2005/0098959 A1    May 12, 2005

(30) Foreign Application Priority Data
Nov. 10, 2003 (DE) ................. 103 53 304

(51) Int. Cl.
*F16J 15/32*    (2006.01)
(52) U.S. Cl. .............. 277/559; 277/551; 277/560; 277/563
(58) Field of Classification Search ........ 277/408, 277/400, 559, 563, 560, 549, 551
See application file for complete search history.

(56) References Cited

U.S. PATENT DOCUMENTS

| | | | | |
|---|---|---|---|---|
| 3,942,805 A * | 3/1976 | Sundqvist | ............. | 277/431 |
| 4,337,956 A * | 7/1982 | Hopper | ............. | 277/552 |
| 4,709,930 A * | 12/1987 | Forch | ............. | 277/430 |
| 4,928,979 A * | 5/1990 | Nagasawa | ............. | 277/348 |
| 5,183,269 A * | 2/1993 | Black et al. | ............. | 277/349 |
| 5,209,502 A * | 5/1993 | Savoia | ............. | 277/562 |
| 6,485,256 B1 * | 11/2002 | Iketani | ............. | 415/113 |
| 6,561,519 B1 * | 5/2003 | Frese et al. | ............. | 277/549 |
| 2003/0168817 A1 * | 9/2003 | Iwakata et al. | ............. | 277/549 |
| 2003/0189293 A1 * | 10/2003 | Johnen | ............. | 277/394 |
| 2004/0160014 A1 * | 8/2004 | Uhrner | ............. | 277/549 |

* cited by examiner

Primary Examiner—Brian E. Glessner
Assistant Examiner—Gilbert Lee
(74) Attorney, Agent, or Firm—Gudrun E. Huckett

(57) ABSTRACT

A sealing ring has a sealing disk having a fastening part and a seal part. The fastening part is connected to a first stationary machine part and the seal part seals a movable machine part and is oriented in an axial direction toward an atmosphere side or a medium side of the sealing ring. The seal part has a first sealing element and a second sealing element adjoining the first sealing element and oriented in a direction opposite to the first sealing element in a mounted position of the sealing ring. The second sealing part rests against the rotary machine part under a radial force.

53 Claims, 22 Drawing Sheets

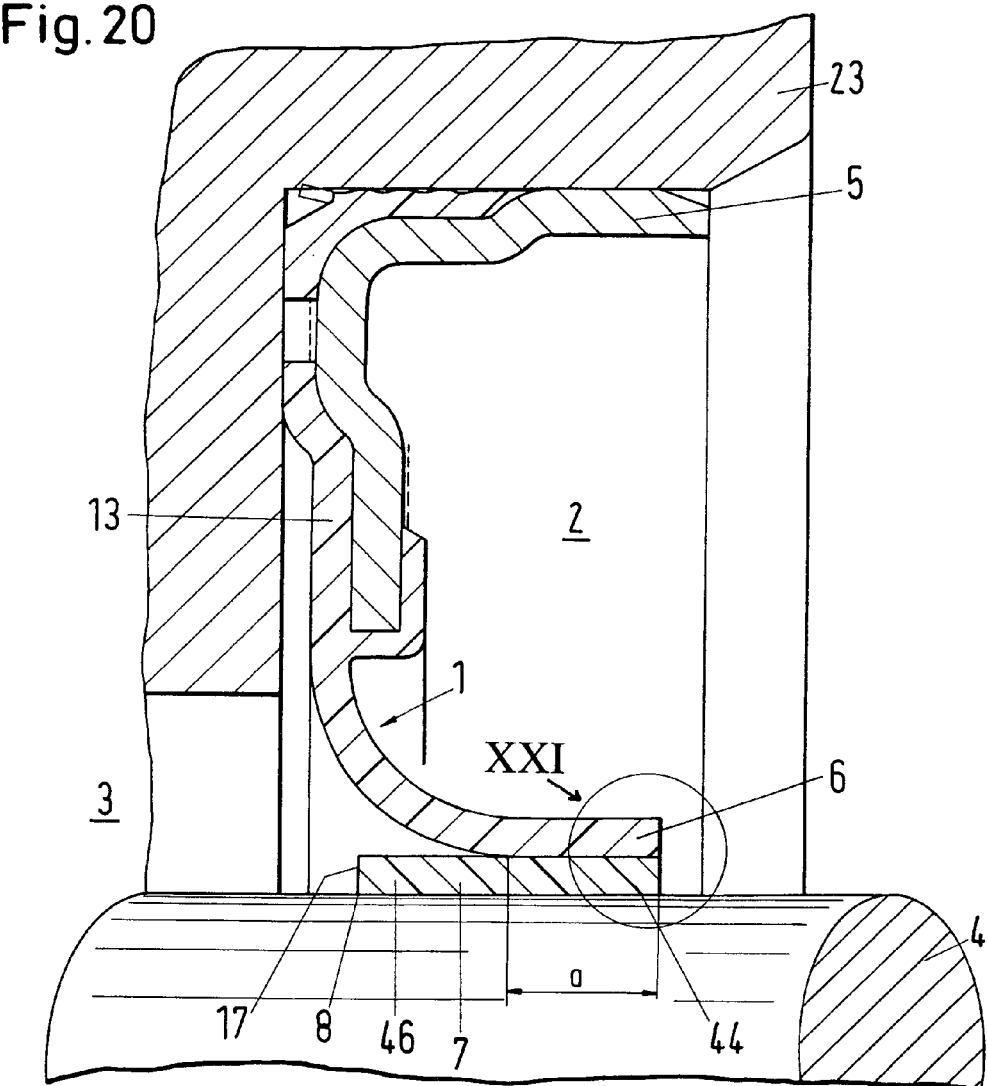
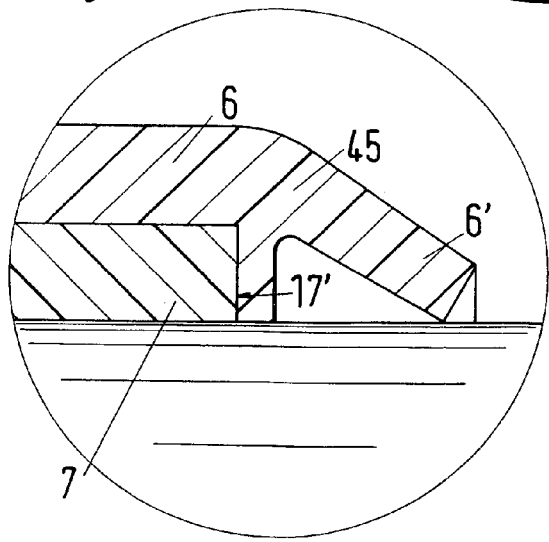

Fig.23
Fig.24
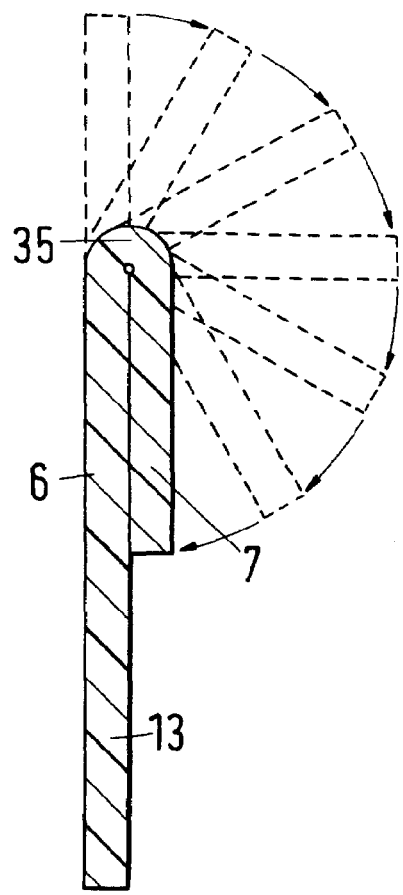
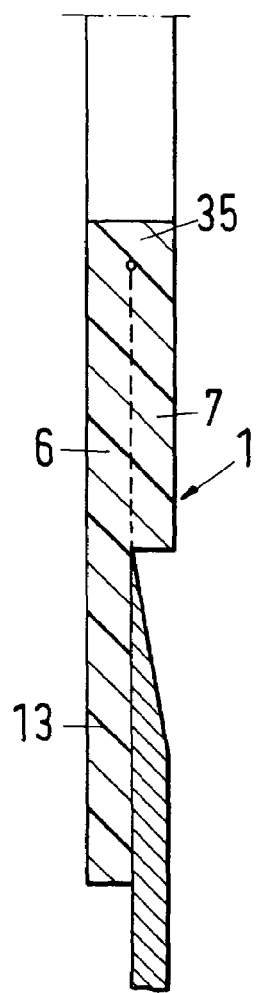

SEALING RING, ESPECIALLY RADIAL SHAFT SEAL

BACKGROUND OF THE INVENTION

The invention relates to a sealing ring, especially a radial shaft seal, piston seal, or rod seal, comprising a sealing disk having at least one fasting part provided on a first, preferably stationary, machine part, and wherein the sealing disk further has a seal part that is correlated with a second, preferably movable, machine part, preferably a shaft. The seal part extends in a direction toward an atmosphere side or medium side of the seal.

Radial shaft seals are known that have a dynamic seal part that is formed by an annular disk of polytetrafluoroethylene. In the mounted state of the sealing ring (seal), it is outwardly curved in the direction toward the air (atmosphere) side and rests with a sealing lip on the rotating machine part, usually a shaft. The size of this known sealing ring is relatively small. Moreover, because the sealing lip is oriented toward the air side of the sealing ring, a special protective lip or dust lip is not needed. This known sealing ring however entails the risk that already at minimal overpressure at the oil (medium) side the sealing lip will lift off the shaft so that the seal is no longer tight. This means, for example, that conventional seal-tightness tests for motors, carried out at only 0.3 bar overpressure, cannot be performed without additional measures by which the sealing location is covered during the test because, if this is not done, the sealing lip will lift off and thus cause leakage.

If such a sealing ring were to be modified in order to be used under pressure loads, the radial pressing force that tightly presses the sealing lip against the shaft would have to be increased to such an extent that the operating or testing pressure would not lift off the sealing lip. However, this would mean that during the generally pressure-free operation the increased radial force would increase the friction between the sealing lip and the shaft and therefore would increase also wear of the sealing lip and of the shaft. Moreover, increased wear would also lead to an increase of the temperature in the sealing gap between the shaft and the sealing lip which thus would increase the risk of so-called carbon fouling and thus of an untimely failure of the sealing ring. Such a sealing ring however has the advantage that when the seal is slipped onto the shaft or the shaft is introduced into the seal, the sealing disk will bend up because in the mounted position it is curved (or bulges) in the mounting direction. Moreover, it is possible that the sealing lip pushed onto the shaft can be checked with regard to possible mounting errors because it is not oriented inwardly but outwardly.

In a similar sealing ring, the sealing lip is curved in the opposite direction, i.e., counter to the mounting direction of the shaft. In order to prevent the sealing disk from turning upside down and thus the sealing disk from being damaged, this sealing ring must be inserted into a mounting sleeve for mounting it on the shaft.

SUMMARY OF THE INVENTION

It is an object of the present invention to configure the sealing ring of the aforementioned kind such that the sealing lip, on the one hand, does not lift off the rotating machine part upon pressure loading and that, on the other hand, increased friction between the sealing lip and the rotating machine part does not occur when operating under pressureless conditions.

In accordance with the present invention, this is achieved in that a second sealing element adjoins the first sealing element, wherein the second sealing element extends opposite to the first sealing element and rests under radial force against the second machine part.

As a result of the configuration of the present invention, a second sealing element is pressure-loaded by a pressure acting on it as well as, optionally, by an overpressure of a medium penetrating from the medium side into the area between the seal elements. As a result of this additional pressing force, it is prevented that the second sealing element can lift accidentally off the movable machine part causing leakage when an overpressure occurs, for example, in the case of seal tightness testing or the like.

Furthermore, when operating pressureless, it is prevented that as a result of excessive friction between the second sealing element and the rotating machine part an untimely wear of these parts will occur. It is moreover advantageous that the sealing ring according to the invention has only minimal size and that no additional sealing lip is required because the second sealing element can be configured to have a sealing edge at the medium side as well as the atmosphere (air) side. Since the second sealing element faces the medium side, the sealing ring can be mounted in a simple way without requiring a mounting sleeve. The invention takes advantage of the fact that the sealing element that is oriented toward the medium side, i.e., toward the space to be sealed off, is pressed by the occurring pressure against the rotating machine part, preferably a shaft, and is not lifted off the shaft. With increasing pressure, pressing of the second sealing element against the shaft is increased even more.

BRIEF DESCRIPTION OF THE DRAWING

FIG. 8 shows a ninth embodiment of a sealing ring according to the invention in a representation corresponding to that of FIG. 1.

FIG. 20 shows the sealing ring according to FIG. 19 in the mounted state.

FIG. 21 shows a detail view XXI according to FIG. 20 of the dust lip of the sealing ring.

FIG. 23 shows the sealing disk of the sealing ring according to FIG. 2 with different deformation stages indicated in dashed lines for forming the second sealing lip.

FIG. 24 shows a sealing disk where the second sealing lip has been produced by removal of material by means of a cutting tool.

DESCRIPTION OF THE PREFERRED EMBODIMENTS

Figure 1:
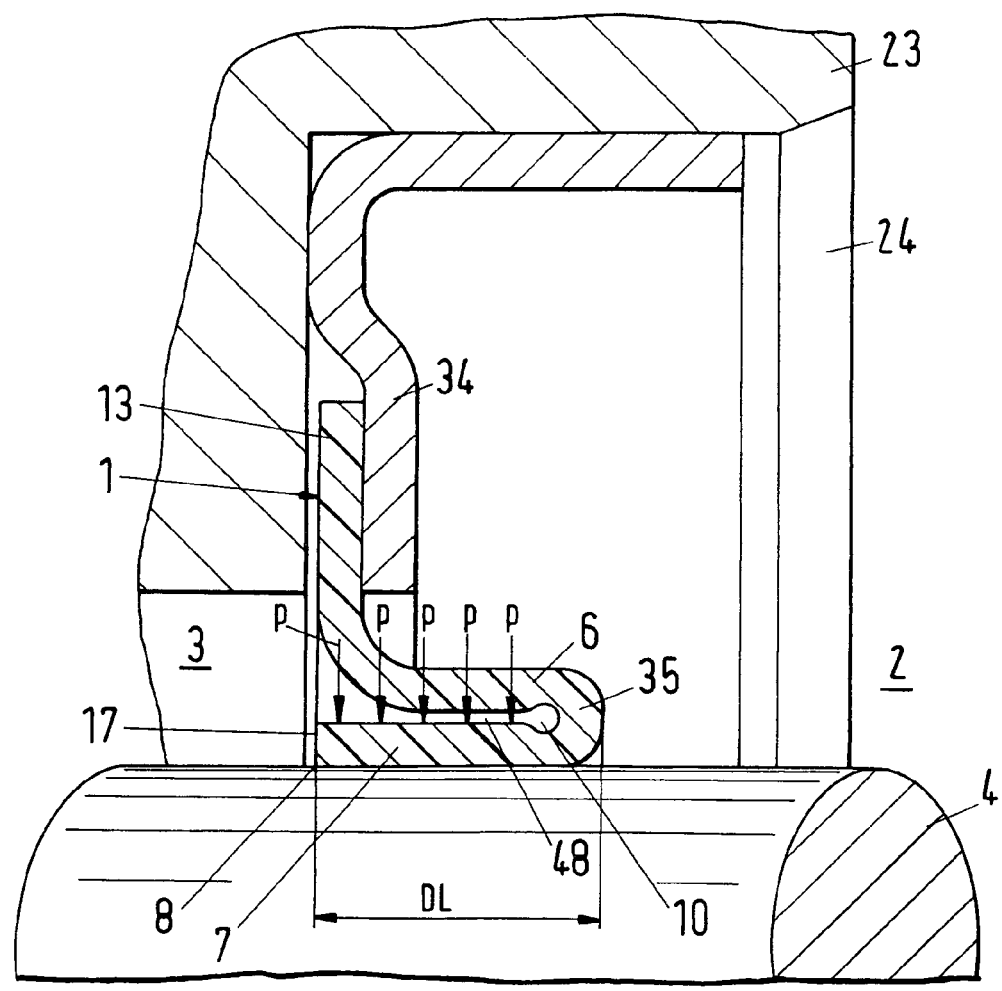
FIG. 1 shows an axial section of one half of a sealing ring according to the invention.

The sealing ring illustrated in FIG. 1 is a radial shaft seal for sealing a shaft 4. The shaft projects through a central opening of a housing 23 of a stationary machine part (not illustrated) such as an engine or drive module. In a receptacle 24 of the housing 23, the sealing ring provided with a cup-shaped seal housing 5 is inserted. The sealing disk 1 is arranged on the seal housing 5 and is comprised preferably of polytetrafluorocarbon, especially polytetrafluoroethylene. Of course, it can be made of any of other suitable material. The sealing disk 1 has a radial outer seal section that forms a fastening part 13 and connects the sealing disk 1 to the seal housing 5. The radial inner annular section of the sealing disk 1 is elastically deformed and thus forms a seal part 6, 7 with which the sealing disk 1 seals relative to the shaft 4. The fastening part 13 is formed by a radially extending outer section which in the mounted position of the sealing ring extends approximately at a right angle relative to the adjoining first sealing element or sealing lip 6 of the seal part 6, 7 that extends axially toward the air side 2. The first sealing lip 6 passes into the second sealing element or sealing lip 7 that extends parallel to it and is oriented toward the medium or oil side 3. The second sealing lip 7 surrounds the shaft 4 seal-tightly. The sealing lip 7 is of the same length as the sealing lip 6; however, the sealing lip 7 can also be somewhat shorter than the sealing lip 6. The sealing lip 7 has a sealing edge 8 with which it seals against the oil side 3. The sealing edge 8 is formed by a radial inner edge of a radially extending free end face 17 of the second sealing lip 7.

Figure 3:
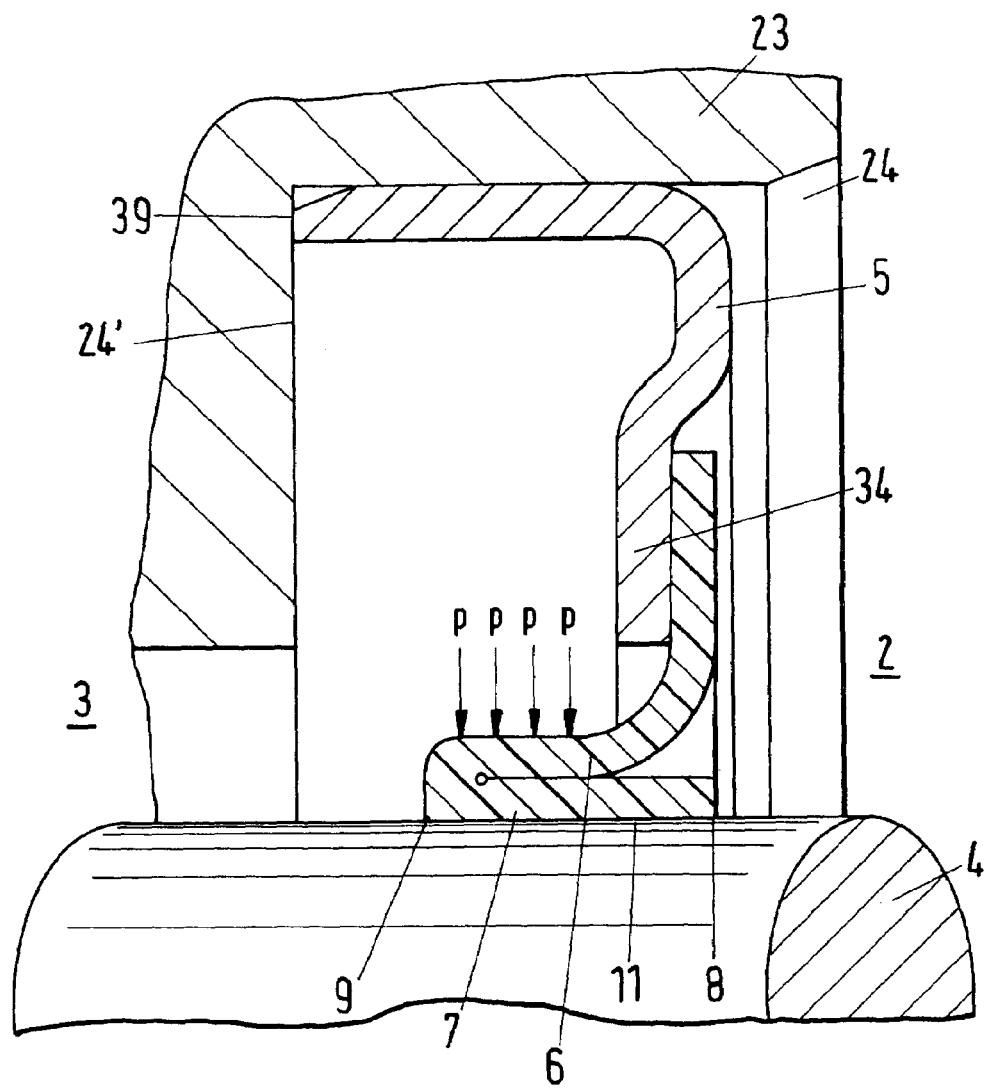
FIG. 3 shows a third embodiment of a sealing ring according to the invention in a representation corresponding to that of FIG. 1.

As illustrated in particular in FIG. 23, the second sealing lip 7 is advantageously produced by rolling in a single working step. The transition section 35 between the sealing lips 6, 7 can be rounded (FIG. 1) or angled (FIG. 3). The second sealing lip 7, as illustrated in FIG. 24, can also be produced by removing a portion of the sealing disk 1. By means of a cutting (peeling) tool, the thickness of the sealing disk 1 is reduced in size from one end such that the fastening part 13 remains. The residual thicker area of the sealing disk 1 is slotted (dashed line in FIG. 24) such that the two sealing lips 6 and 7 are produced that have a transition into one another by means of the transition section 35. As illustrated in FIG. 1, the sealing disk 1 with its fastening part 13 is glued directly onto the seal housing 5, in particular, onto a bottom part 34 that is displaced axially inwardly. Unlike the sealing lip 7, the first sealing lip 6 that is oriented toward the air side 2 does not rest directly against the shaft 4. Between the first and the second sealing lip 6, 7, the transition section 35 is provided, advantageously at least on one side (in the embodiment on the oil side 3 of the sealing disk 1), with a concentrically extending groove, for example, by embossing. The groove 10 acts as a hinge between the first and second sealing lips 6, 7 and ensures a defined deflection point for the second sealing lip 7 relative to the first sealing lip 6. The groove 10 forming the hinge has advantageously a round cross-section.

According to FIG. 1, for an overpressure p acting on the oil side 3, the second sealing lip 7 is pressed against the shaft 4 so that the sealing lip upon overpressure does not open but is tightly pressed with its sealing edge 8 against the shaft 4. In the mounted position, between the first and the second sealing lips 6 and 7 a narrow annular chamber 48 is formed that is closed relative to the air aside 2 by the transition section 35 and into which the medium, especially oil, to be sealed can flow.

In the described sealing ring for sealing the oil space 3, the sealing edge 8 can also serve as a return thread for conveying the oil back to the oil space 3. In this case, the sealing lip 7 has a contact area surrounding the shaft 4 provided with a thread which is formed, for example, by embossing. This thread, as is known in the art, can transport oil that has reached the space between the sealing lip 7 and the shaft 4 back into the oil space 3. The oil therefore does not leak from the space to be sealed. In order to generate a satisfactory return flow effect, the engaging thread length of the return thread must be correspondingly long. The longer the thread, the stronger the return flow effect. The sealing ring can be designed such that either the sealing of the oil space 3 or the protective action against penetration of foreign particles originating at the air side 2 has priority.

The sealing ring can thus be matched to the different applications and operating conditions.

Figure 2:
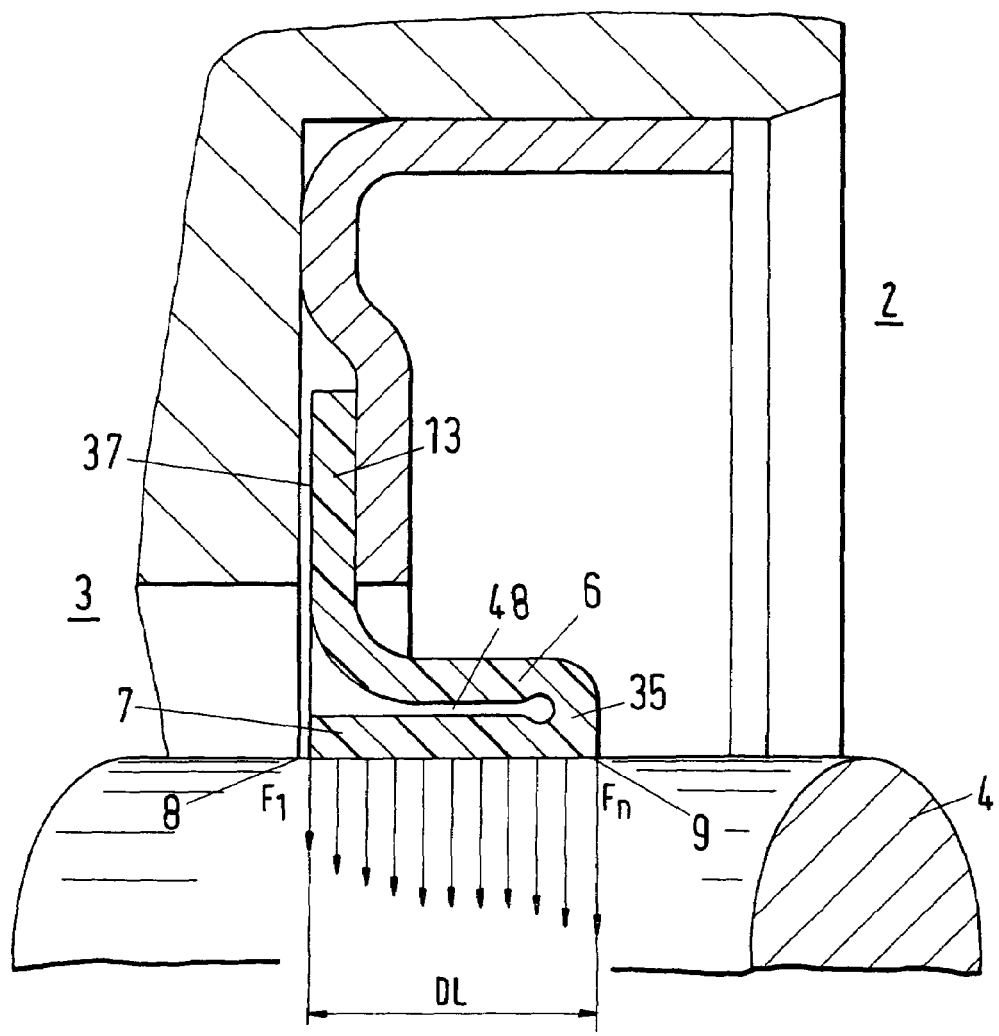
FIG. 2 shows a second embodiment of a sealing ring according to the invention in a representation corresponding to that of FIG. 1.

One embodiment is shown in FIGS. 2 and 3. The sealing ring according to FIG. 2 is substantially identical to that of FIG. 1. However, it differs in that the transition section 35 to the first sealing lip 6 is provided with a radial inner sealing edge 9. However, the sealing lip 7 can be formed also to have a rounded transition section without secondary sealing edge 9. Also, the sealing lip 7 can be shorter than the sealing lip 6. The sealing lip 7 extends to the level of the outer side 37 of the fasting part 13 facing the oil side 3 so that it surrounds the shaft 4 with a relatively long sealing length section DL. The primary sealing edge 8 is oriented toward the oil space 3 while the dirt sealing action at the air side 2 is provided by the secondary sealing edge 9.

The sealing ring according to FIG. 3 shows sealing edges 8 and 9 having the reverse function because the sealing ring is mounted in a reverse position in the housing 23. The sealing ring arrangement of FIG. 3 differs thus from that according to FIG. 2 only by the position of the sealing ring in the round machine part: the seal housing 5 rests with the end face 39 of its outer wall 38 on the radial bottom 24' of the receptacle 24 and the first sealing lip 6 faces the oil side 3. The radial bottom 34 of the seal housing 5 points toward the air side 2. In the embodiment according to FIG. 3, the primary sealing edge 8 is oriented toward the air side 2 for fending off strong contamination. The sealing action toward the oil space 3 is realized by means of the secondary sealing edge 9. For improving the sealing action, the secondary sealing edge 9, as illustrated in the embodiment of FIG. 2, is positioned at a right angle, is sharp-edged or provided with a smaller clearance than the remaining contact surface 11 of the second sealing lip 7 that is oriented toward the air side 2.

As also shown in FIGS. 2 and 3, when excess pressure is present within the oil space 3, in both cases the sealing lip 7 is pressed by the overpressure p sealingly against the shaft 4. In the case of the sealing ring according to FIG. 2, the medium can flow into the annular chamber 48 between the two sealing lips 6 and 7 and can press the sealing lip 7 against the shaft 4. In the case of the sealing ring according to FIG. 3, the sealing lip 6 is pressed by the overpressure p against the sealing lip 7 that is forced, in turn, against the shaft 4.

As is also illustrated in FIGS. 2 and 3, the sealing rings can be used even when overpressure is present at the oil side 3 as well as the air side 2 of the seal. This means that the sealing ring is suitable also for separating two pressure chambers relative to one another. The radial shaft seal according to FIG. 2 is configured without return conveying device (for short, return device). The sealing action relative to the oil space 3 is realized by the primary sealing edge 8. Since in the case of the sealing principle "sealing edge" as a result of its operation only a very minimal amount of oil that can be used as a lubricant penetrates into the area between the second sealing lip 7 and the shaft 4, the sealing lip length DL is advantageously significantly shorter than in the configuration with return effect; compare also FIGS. 2 and 5.

Figure 5:
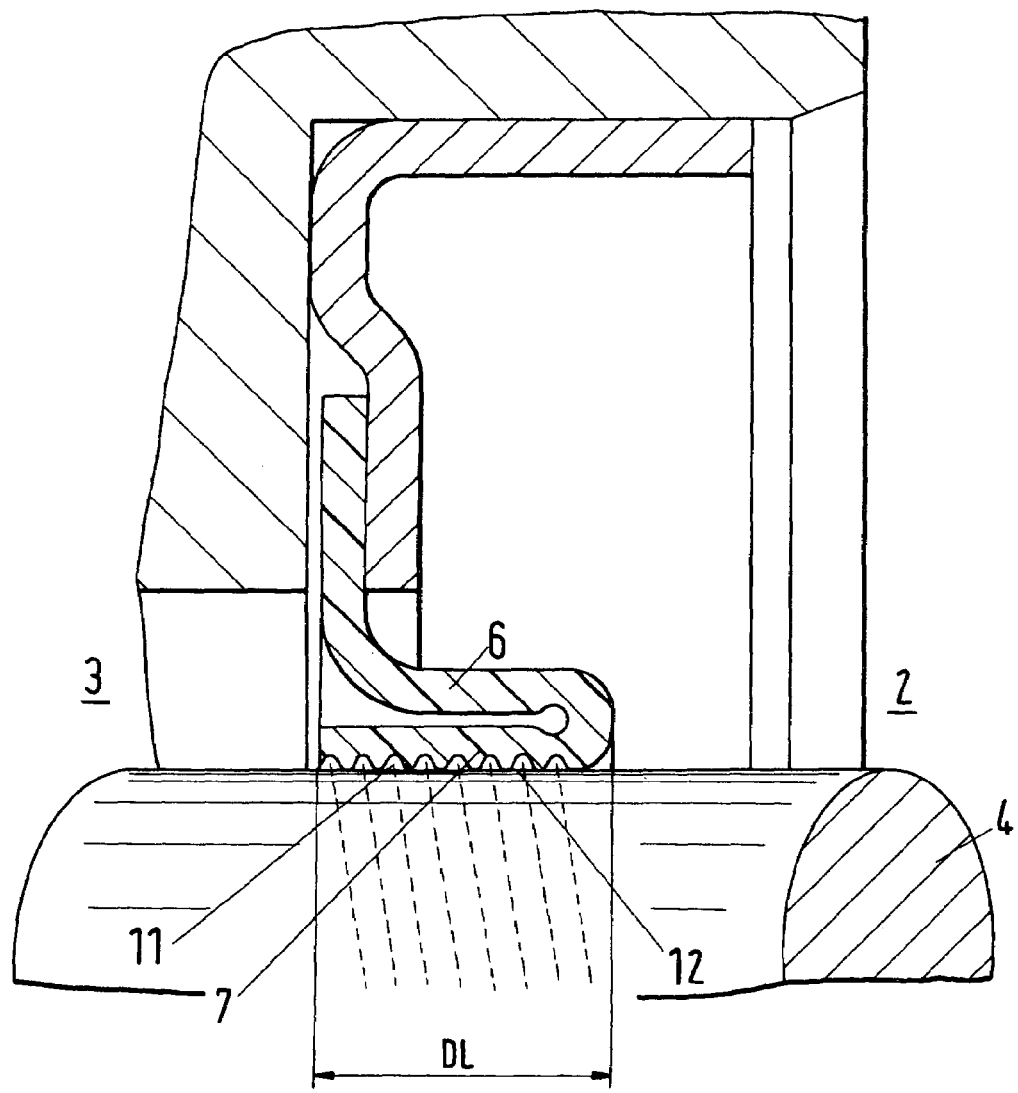
FIG. 5 shows a fifth embodiment of a sealing ring according to the invention in a representation corresponding to that of FIG. 1.

As illustrated in FIGS. 2 and 5, the shortened sealing lip length DL enables a correspondingly narrow sealing ring which leads to a reduction of the mounting space and thus to cost and weight savings on the engine or drive device to be sealed.

In FIG. 2, the pressure distribution of the second sealing lip 7 in the axial direction is illustrated. This pressure distribution results from the restoring forces $F_1$ to $F_n$. The two restoring forces $F_1$ and $F_n$ are illustrated in FIG. 2 in a representative capacity. These restoring forces result because the sealing lips 6 and 7 are formed from the initial plane sealing disk 1 and the sealing lips 6, 7, because of their memory effect, want to return into the plane initial disk shape. Because the shaft 4 prevents this from happening, the sealing lips 6 and 7 exert a corresponding force or surface pressure onto the shaft 4. The pressing force increases from the sealing edge 8 at the oil side 3 toward the sealing edge 9 at the air side 2 and is highest at the edge 9. By means of such a pressure distribution an optimal sealing action results.

Figure 4:
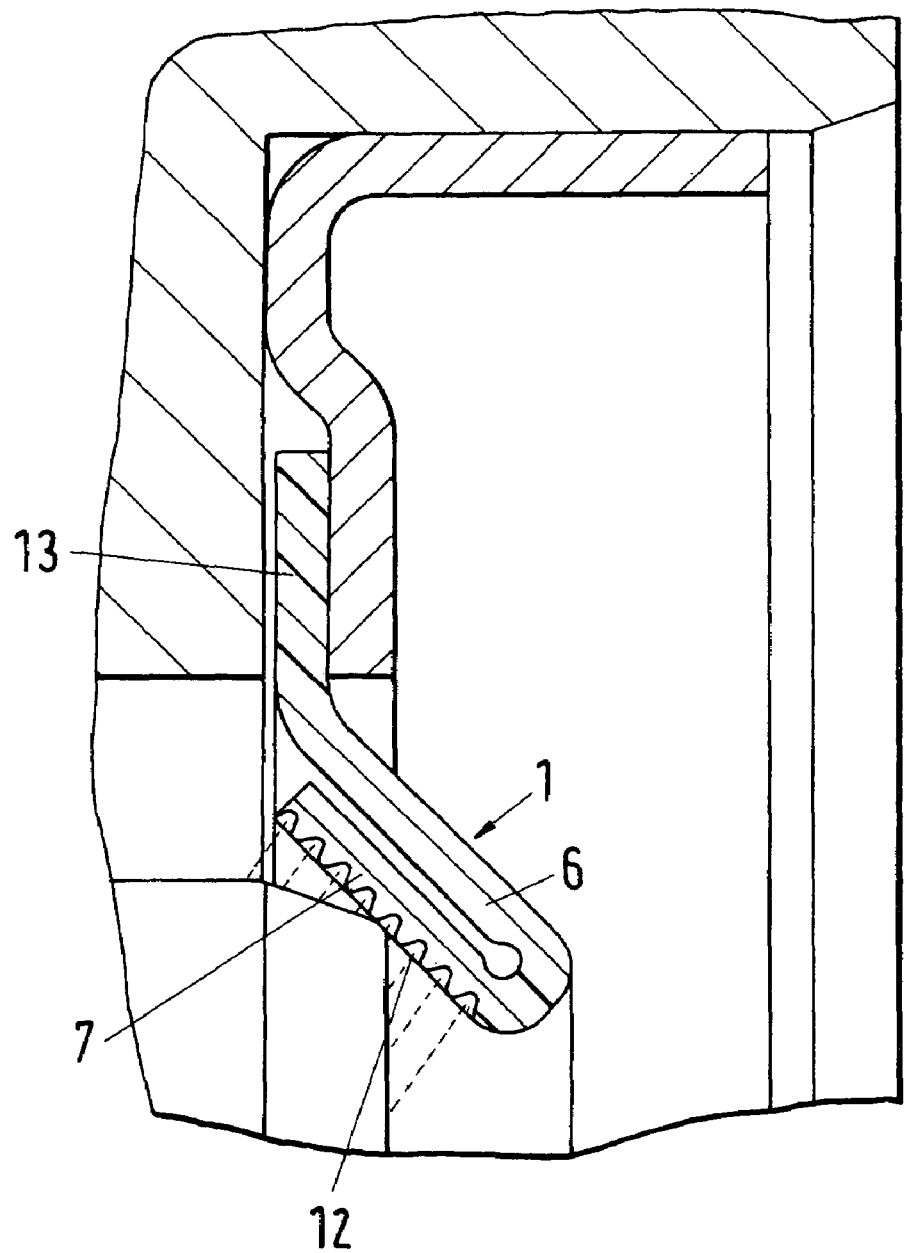
FIG. 4 shows a fourth embodiment of a sealing ring according to the invention in a representation corresponding to that of FIG. 1.

FIG. 4 shows the situation when introducing the shaft 4 into the sealing ring or when pushing the sealing ring onto the shaft. It can be seen clearly that when the sealing ring is pushed, the sealing disk 1 or its sealing part 6, 7 will be bent open in the insertion direction of the shaft 4 so that turning inside out is prevented and the sealing disk is protected from being damaged.

FIG. 5 shows a radial shaft seal where the contact surface 11 of the second sealing lip 7 is provided with a return conveying device 12. As is known in the art, it is embodied in the form of a thread that is produced in the sealing lip 7, for example, by embossing. The return thread 12 has the task to return oil that has penetrated the area between the shaft 4 and the contact surface 11 back to the oil side 3 in order to prevent oil from escaping to the air side 2. This principle has the advantage that a minimal amount of oil is allowed to enter the space between the contact surface 11 and the shaft 4 in order to reduce in this way friction and thus the sealing gap temperature and, therefore, also the risk of carbon fouling. In other regards, the sealing ring is identical to the embodiment of FIG. 2.

Figure 6:
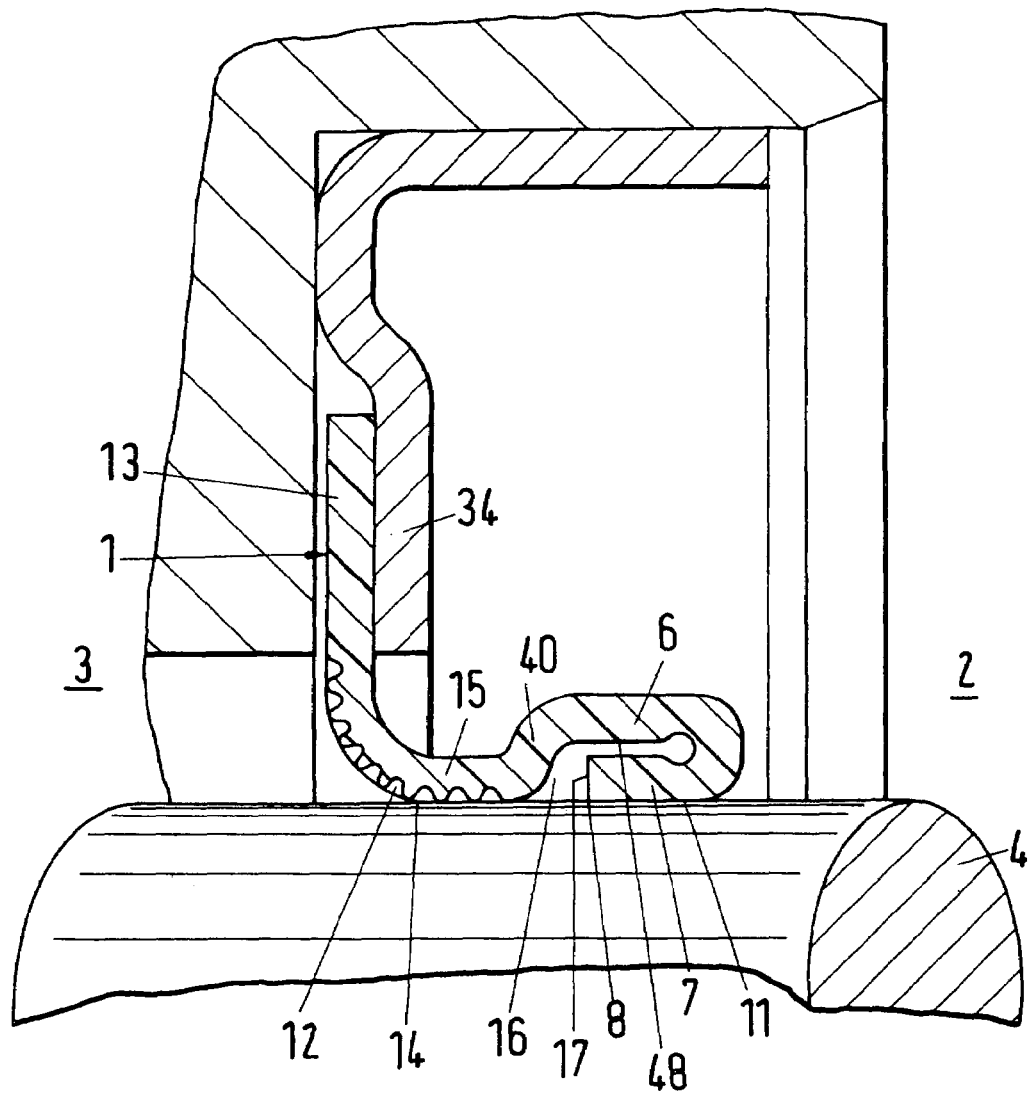
FIG. 6 shows a sixth embodiment of a sealing ring according to the invention in a representation corresponding to that of FIG. 1.

The sealing ring according to FIG. 6 differs from that of FIG. 2 in that the sealing part 6, 7, 15 has a third sealing element or sealing lip 15 which is provided at the oil side in front of the two sealing lips 6, 7. In this way, two sealing part sections operating according to different sealing principles are provided. The second sealing lip 7 has on its contact surface no return device; however, the sealing edge 8 is provided with such a device on its free end. The sealing disk 1 is configured such that in the operating state of the sealing ring in the area between the fastening part 13 and the first sealing lip 6 a radial constriction is provided such that the opening of the constriction before mounting of the sealing ring is smaller then the shaft diameter. In this way, the constriction rests with pretension against the shaft 4. The contact surface 14 of the constriction forms the third sealing lip 15 that is arranged in front of the second sealing lip 7. The third sealing lip 15 passes via a slantedly outwardly extending step or shoulder 40 into the second sealing lip 6. Between the shoulder 40 and the free end face 17 of the second sealing lip 7 an intermediate chamber 16 is formed as a reservoir. The annular chamber 48 between the two sealing lips 6, 7 opens into the chamber 16. In the illustrated embodiment, the contact surface 14 is provided with a return thread 12 so that oil that has collected in the intermediate chamber 16 is returned into the oil space 3. The oil in the intermediate chamber 16 serves for lubricating the sealing lip 7; this means lubrication for reducing friction between the sealing lips 7 and 15 and the shaft 4, and, in turn, a reduction of the sealing gap temperature and of carbon fouling. The third sealing lip 15 has an arc-shaped transition into the fastening part 13 that, in accordance with the preceding embodiments, is positioned in a radial plane and is used to connect the sealing disk 1 to the axially inwardly displaced section of the bottom 34 of the seal housing 5. As in the previously described embodiments, the radial inner section of the bottom 34 is bent so far axially inwardly that the step or spacing that is created is somewhat greater than the thickness of the fastening part 13.

In contrast to the embodiment according to FIG. 6, it can also be advantageous to provide the contact surface 11 of the second sealing lip 7 with a conveying device and to provide the contact surface 14 of the third sealing lip 15 with a smooth configuration instead. Because the third sealing lip 15 then lacks a sealing edge as well as a conveying action in the direction toward the oil space 3, a minimal amount of the oil to be sealed can pass in operation of the sealing ring into the area between the shaft 4 and the third sealing lip 15 and can collect in the intermediate chamber 16. This oil is then available as a lubricant for the two sealing lips 7 and 15. Since the oil is prevented from escaping from the interior chamber 16 by the conveying device 12 of the second sealing lip 7 as well as by the third sealing lip 15, for phases of insufficient lubrication that occur frequently during operation of the sealing ring or even dry running there is always a sufficient amount of lubricant is available during operation; this can significantly extend the service life of the sealing ring.

The intermediate chamber 16 can advantageously also be filled with a suitable agent, for example, grease before mounting the sealing ring. This agent can fulfill two functions. On the one hand, it acts as a lubricant for the two sealing lips 7, 15 which can be especially important in the case of dry running but also during starting of the engine because there not always a sufficient supply of oil to the seal is ensured in the starting phase. An agent that has been introduced into the intermediate chamber 16, for example, grease, can fulfill, on the other hand, a further important function. As already mentioned, motors are subjected to a seal tightness test in which the motor is exposed from the interior to an air overpressure. In the case of the described sealing rings according to FIGS. 1, 2, and 5, it is advantageous that the second sealing lip 7 upon overpressure is pressed against the shaft 4 and, in this way, the sealing lip is prevented from lifting off the shaft. When however the contact surface 11 of the second sealing lip 7 is provided with a conveying device, the thread of such a conveying device acts as a leakage path. It is known in the art to therefore provide the thread with at least one stop in the form of a transverse stay so that the thread is closed in this way at several locations. Since the stop closes the thread, this not only prevents the medium to be sealed from passing but also prevents a pumping effect in the opposite direction. When the intermediate chamber 16 is filled with grease, the grease not only acts as of lubricant but also closes during the testing step the thread of the second sealing lip 7. Stops that will reduce the effectiveness are thus not needed.

In the embodiment illustrated in FIG. 6, it is also not necessary to provide stops. The contact surface 11 of the second sealing lip 7 is not provided with a conveying thread but is smooth because the conveying device 12 is provided on the third sealing lip 15. This has two important advantages. On the one hand, the second sealing lip 7 that is pressed by the excess testing pressure during motor testing against the shaft 4 seals properly. On the other hand, the second sealing lip 7 seals safely also when the shaft is standing still, i.e., when a return conveying action is completely lacking. This is important when the oil level is higher than the lower shaft edge or when the vehicle in question is parked at a great incline. This embodiment combines thus excellent return action with excellent lubrication action and a static seal tightness.

In contrast to the embodiment of FIG. 6, the second sealing lip 7 and the third sealing lip 15 can both be provided at their contact surfaces 11 and 14 with a known conveying device 12, for example, a thread. The two-fold arrangement of the conveying device 12 has several advantages. The two conveying threads 12 can be identical or different. For example, as a result of different pitch the conveying action of the third sealing lip 15 can be stronger than that of the second sealing lip 7. It is however also conceivable that the third sealing lip 15 conveys in the direction toward the oil space 3 and the second sealing lip 7 conveys in the direction toward the air side 2.

The division of the sealing function onto two sealing lips 7 and 15, as illustrated in FIG. 6, has also another important advantage, i.e., the sealing function has redundancy. In this case if one of the sealing lips 7, 15 leaks, the other can take over the sealing function.

Figure 7:
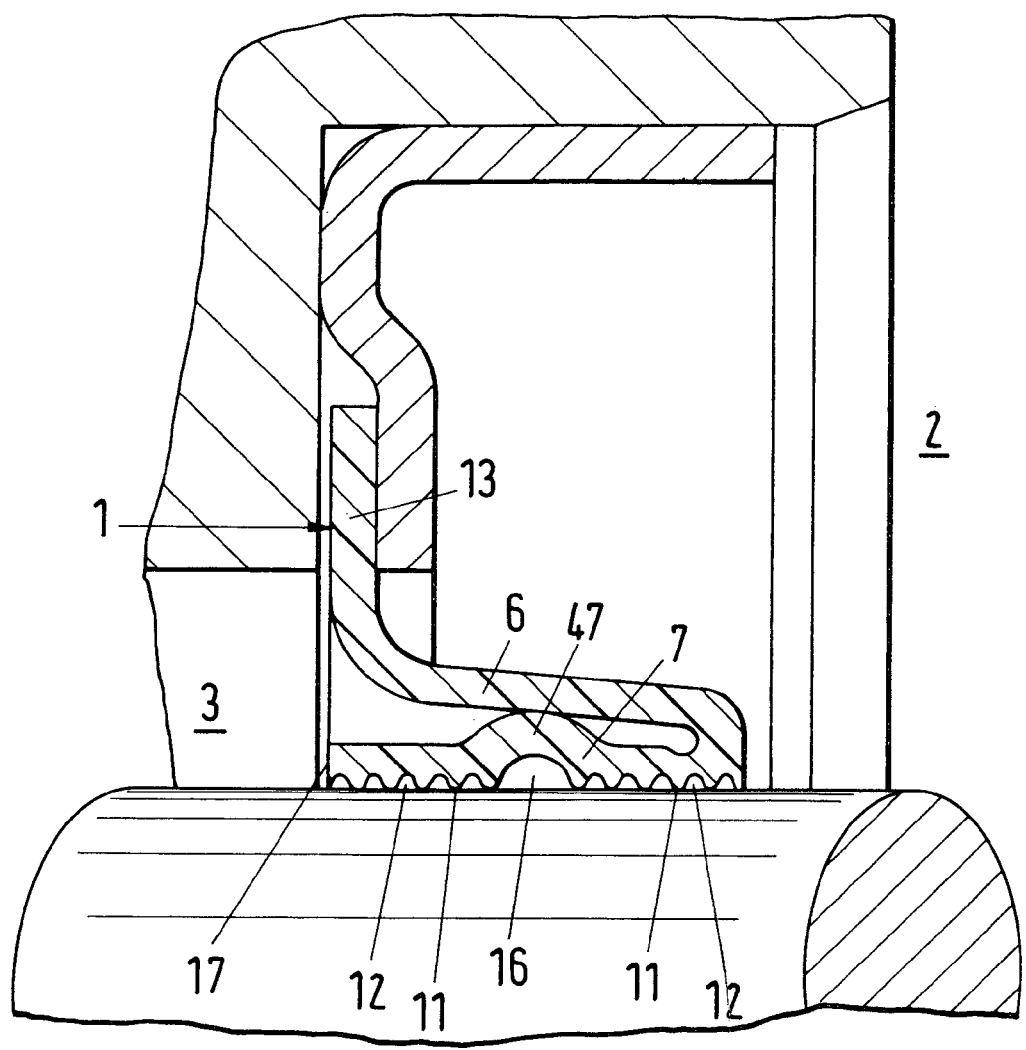
FIG. 7 shows a seventh embodiment of a sealing ring according to the invention in a representation corresponding to that of FIG. 1.

FIG. 7 shows a further configuration of the sealing ring in which the intermediate chamber 16 is not between the second sealing lips 7 and the third sealing lip 15 but preferably is provided by a concentrically extending groove 47 that is provided in the second sealing lip 7, for example, by embossing. It has a curved bottom in axial section and is curved outwardly. The groove is provided approximately at half the length of the second sealing lip 7. The contact surface section 11 of the second sealing lip 7 before and behind the intermediate chamber 16 can be provided with a conveying device 12. In this connection, the conveying device of the two contact surface sections 11 can be oriented in the same direction but also in opposite direction. The two contact surface sections 11 can also be smooth, i.e., without a conveying device. The described configuration has the advantage that despite a simple configuration and thus a simple manufacture, a lubricant reservoir is provided as well as a certain redundancy because of the division of the contact surface into two separate sections 11. The advantage of the lubricant reservoir has been discussed already above. In other regards, the sealing ring is identical to the sealing ring of FIG. 5. The second sealing lip 7 in the embodiment is of identical length. However, it can also be longer than the first sealing lip 7 so that it actually projects at the oil side past the fastening part 13. The first sealing lip 6 rests on the groove 47 provided in the second sealing lip 7. The intermediate chamber 16, i.e., the lubricant reservoir, can have with regard to the circumference a non-uniform spacing from the end face 17 of the second sealing lip 7 in that the groove that forms the intermediate chamber 16, for example, is not produced concentric but eccentric or wave-shaped, like the sealing edge 17 in FIG. 9, in the sealing disk 1 that forms the sealing lip. The advantage of such a configuration is that the lubricant in the intermediate chamber 16 is distributed in the axial direction across a wider range of the shaft surface and lubrication of the sealing lip 7 is improved in this way. The two contact surface sections 11 can also be differently designed. For example, the contact surface section 11 at the side facing the oil has a conveying device while the other contact surface section 11 is smooth. This has the advantage, as described in connection with the embodiment of FIG. 6, that this seal is seal-tight dynamically because of the conveying device in the first contact surface section 11 as well as seal-tight statically because of the smooth configuration of the second contact surface 11 and exhibits minimal friction because of the lubricant reservoir 16.

When the distribution of the lip pressing force against the shaft 4 in the axial direction is measured, typically it is found that for a smooth contact surface the maximum of the pressing force is located between the end points of the contact surface 11. A high pressing force means also an increased friction and thus an increased sealing gap temperature and, in turn, an increased risk of carbon fouling. When the intermediate chamber 16 is positioned at the location of the maximum pressing force, the risk of carbon fouling can be reduced because a peak pressing force is not present and because the lubrication is improved because of the reservoir effect.

Figure 8:
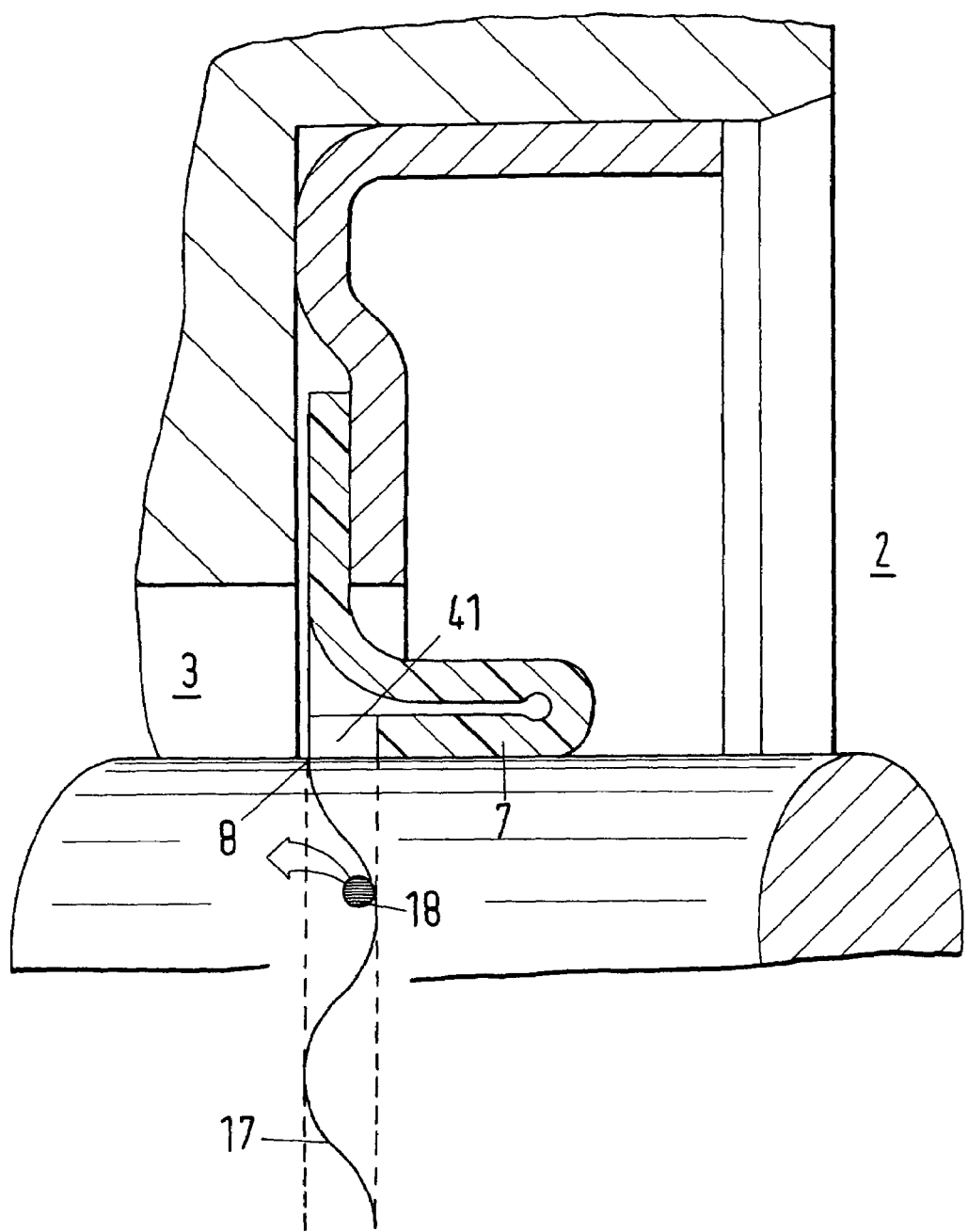
FIG. 8 shows an eighth embodiment of a sealing ring according to the invention in a representation corresponding to that of FIG. 1.
Figure 9:
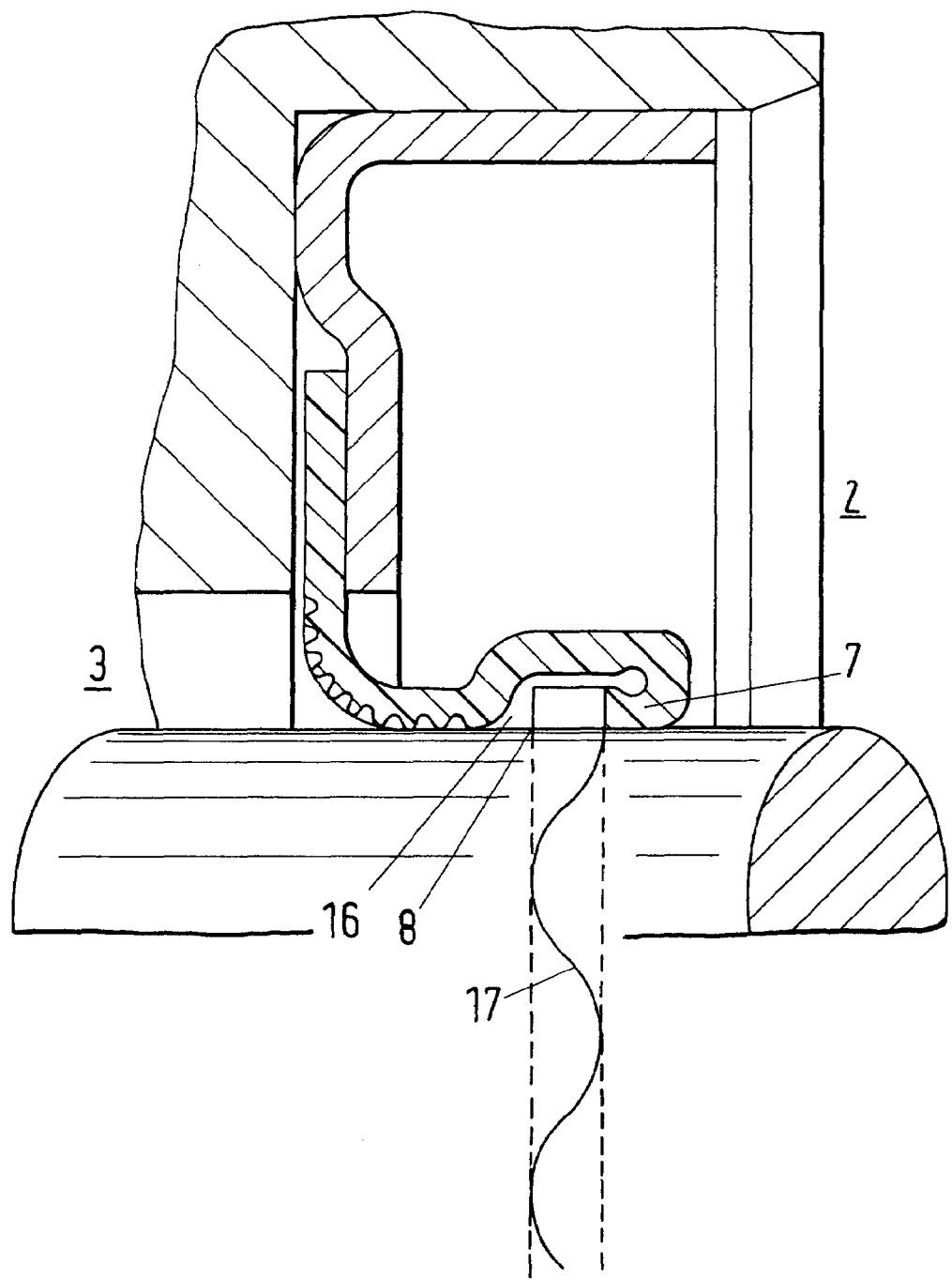

While the afore described conveying threads 12 can convey only in one rotary direction of the shaft 4 in the desired way, the embodiment of the second sealing lip 7 of FIGS. 8 and 9 is effective in both rotary directions. This effect is achieved in a simple way. The sealing disk 1 is originally a plane disk with a concentric hole from which with known methods the geometry of the sealing disk illustrated in the individual Figures is produced. In the embodiment according to FIGS. 8 and 9, the hole is produced for example, by stamping, so as to have a wave-shaped edge 17 and not a circular edge. An oil drop 18 entrained by the rotating shaft 4 that hits the wave-shaped edge 41 of the second sealing lip 7 is returned by the flank of the wave-shaped end face 17 that is oriented toward the oil space 3 in the direction toward the oil space 3. For a symmetric configuration of the wave shape, this functions in both rotary directions in the same way. The configuration according to FIG. 8 corresponds in other regards to that of FIG. 1.

The embodiment according to FIG. 9 corresponds to that of FIG. 6 and has also the advantages of this sealing ring. In the sealing ring according to FIG. 9, the lubricant that has collected in the intermediate chamber 16 is moved back and forth in the intermediate chamber 16 by the wave-shaped end face 17 of the second sealing lip 7; this contributes to an improvement of the lubrication between the sealing lip 7 and the shaft 4.

Figure 10:
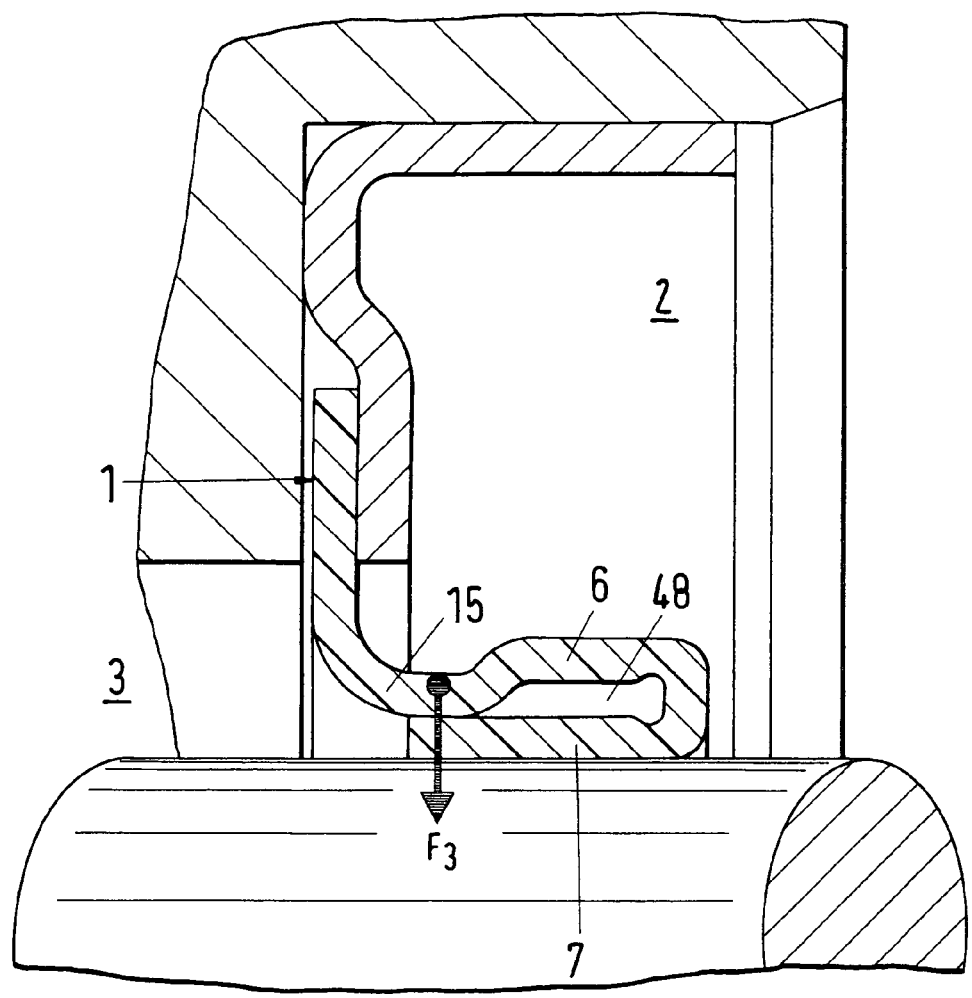
FIG. 10 shows a tenth embodiment of a sealing ring according to the invention in a representation corresponding to that of FIG. 1.

In the above described embodiments, the distribution of the local pressing action of the sealing lip 7 against the shaft 4 which is decisive for this sealing action is based on the restoring forces of the sealing disk 1 deformed by the shaft 4 inasmuch as no forces of the surrounding pressure are present. The embodiment according to FIG. 10 is similar to that of FIGS. 6 and 7. The third sealing lip 15 rests in this sealing ring at a spacing from the shaft 4 so that an additional radial force $F_3$ is exerted onto the second sealing lip 7. The position of the contact point between the third and the second sealing lips 15 and 17 as well as the geometric configuration of the third sealing lip 15 have an effect on the pressing course and the magnitude of pressure of the second sealing lip 7. In the illustrated embodiment, the third sealing lip 15 rests against the free end of the second sealing lip 7. Moreover, the first sealing lip 6 has a greater radial spacing from the second sealing lip 7 so that between these sealing lips a relatively wide annular chamber 48 is formed into which the oil can penetrate as a lubricant when the pressing force of the sealing lip 15 drops upon overpressure in the oil space 3.

Figure 11:
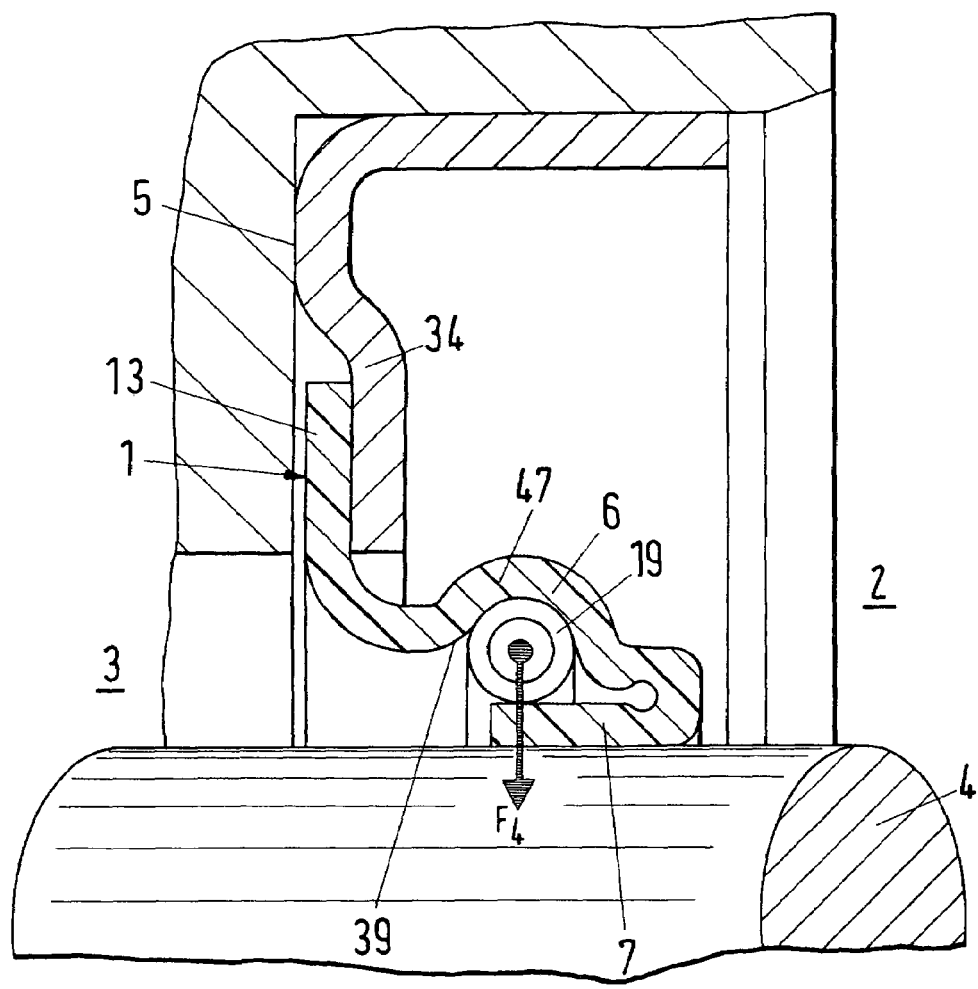
FIG. 11 shows an eleventh embodiment of a sealing ring according to the invention in a representation corresponding to that of FIG. 1.

FIG. 11 shows a radial shaft seal in which an additional radial force $F_4$ is supplied by an annular closed tension spring 19. The sealing ring is identical to the sealing ring according to FIG. 8 with the exception of the configuration of the first sealing lip 6. The first sealing lip 6 has a transition at a relatively great radial spacing from the shaft 4 into the fasting part 13 of the sealing disk 1. The sealing lip 6 has approximately at half the axial length an annular groove 47 which is curved outwardly away from the shaft 4. It serves for receiving the spring 19. The groove 47 in the radial direction toward the shaft 4 is partially closed by the second sealing lip 7 which projects to approximately half the width of the groove 47.

In the mounted state, the spring 19 is secured in the groove 47 against falling out from the sealing disk 1. Relative to the air side 2, the spring 19 is surrounded about approximately half the winding diameter of the spring by the groove 47 and rests with its radial inner side against the second sealing lip 7.

Like the third sealing lip 15 in FIG. 10, the tension spring 19 presses against the second sealing lip 7 and increases in this way locally the pressure force of the second sealing lip 7 against the shaft 4. The groove 47 is advantageously formed by a deformation of the first sealing lip 6. The tension spring 19 rests areally against the bottom of the groove 47. As shown in the drawing, the groove 47 is positioned on the side of the bottom 34 of the seal housing 5 facing away from the fasting part 13 of the sealing disk 1 and faces the air side 2.

Figure 12:
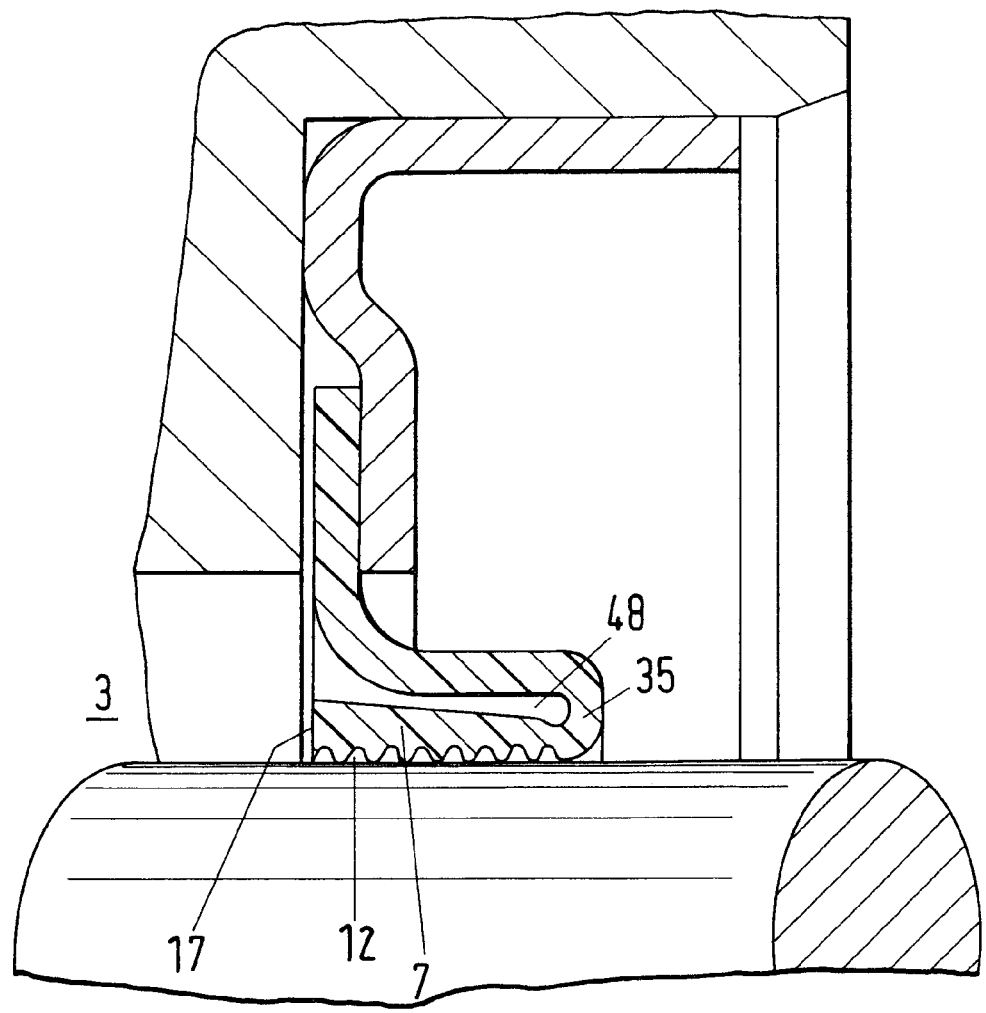
FIG. 12 shows a twelfth embodiment of a sealing ring according to the invention in a representation corresponding to that of FIG. 1.

FIG. 12 shows a sealing ring in which the radial force increases in the direction to the oil side 3. The sealing ring according to FIG. 12 corresponds substantially to that of FIG. 5 with the difference that the second sealing lip 7 is somewhat shorter than that according to FIG. 5 and that its thickness in the direction to the oil side 3 increases steadily in a direction away from the transition section 35. The section 35 is formed in the embodiment according to FIG. 5 with a return conveying device 12. The thickness of the second sealing lip 7 can however also be reduced toward the oil side 3. With such a non-uniform cross-section of the sealing lip 7 it can be prevented that the free end of the sealing lip 7 or its end face 17 is lifted off the shaft 4 and that passing of the medium to be sealed underneath the sealing lip 7 is facilitated. The height of the annular chamber 48 between the two sealing lips 6, 7 is reduced continuously from the transition section 35. The sealing lip 7 can be formed also with a sealing edge relative to the atmosphere side.

Figure 13:
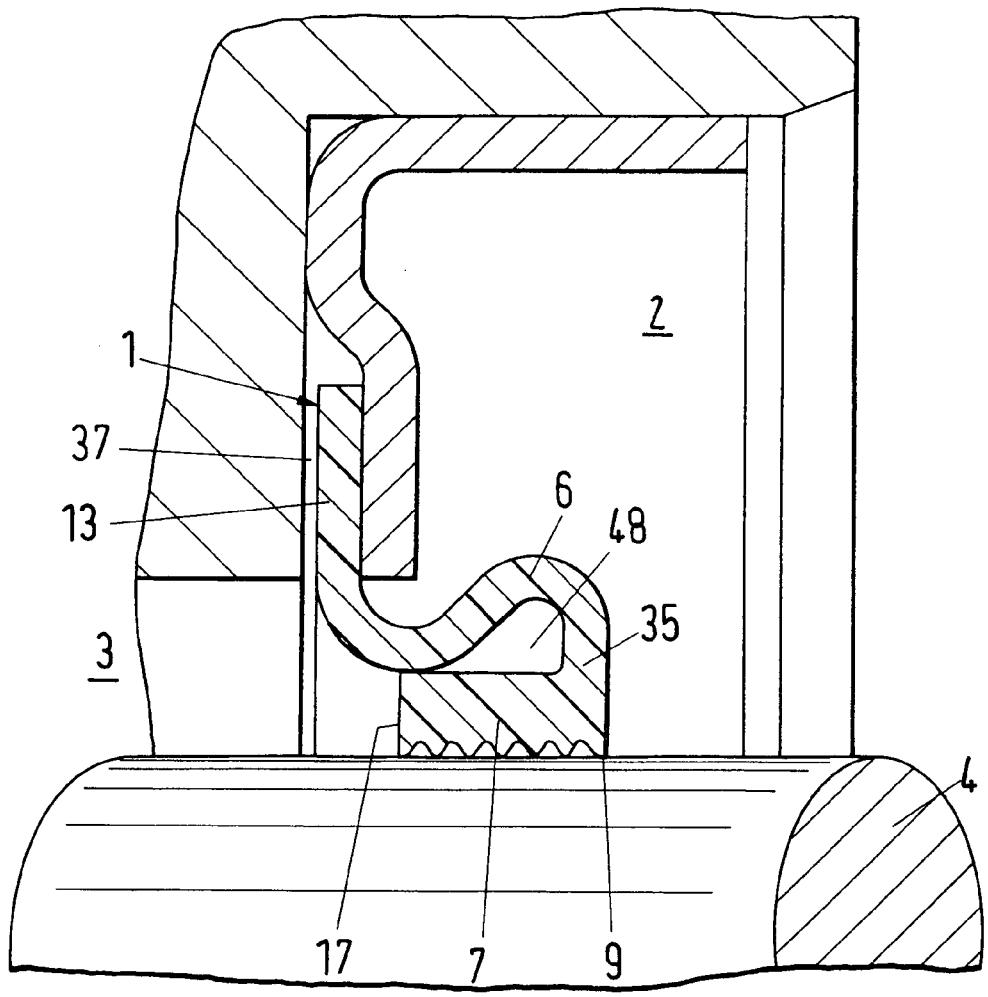
FIG. 13 shows a thirteenth embodiment of a sealing ring according to the invention in a representation corresponding to that of FIG. 1.

FIG. 13 shows a radial shaft seal that, as in the embodiment according to FIG. 11, has a first sealing lip 6 which in the axial direction of the shaft 4 in axial section is curved to an S-shape and passes by a transition section 35 having a sealing edge 9 at the air side into the second sealing lip 7. The second sealing lip 7 is shorter than the sealing lip 6 and extends to the location of the S-shaped section of the sealing lip 6 adjoining the fastening section 13 and being closest to the shaft 4 where it rests against the second sealing lip 7. The sealing lip 7 can also be of the same length as the sealing lip 6 so that the end face 17 extends to the level of the outer side 37 of the fastening part 13 of the sealing disk 1. However, its thickness in comparison to the remaining areas of the sealing disk is greater. In contrast to the embodiment of FIG. 12, the sealing ring according to FIG. 13 has a constant cross-sectional thickness in the axial direction. The height and the extension of the radial force are determined mainly by the second sealing lip and to a lesser degree by the remaining areas of the sealing disk 1. The S-shape of the sealing lip 6 enables an excellent movability of the second sealing lip 7 adjoining the sealing lip 6 at the free end of the S-shape at the air side of the transition section 35. In this way, the relatively stiff sealing lip 7, despite its increased cross-section, can follow very well an eccentrically supported or eccentrically running shaft without there being the risk of leakage. The two sealing lips 6 and 7 delimit the surrounding annular chamber 48 that has approximately a part-circular cross-section.

Figure 14A:
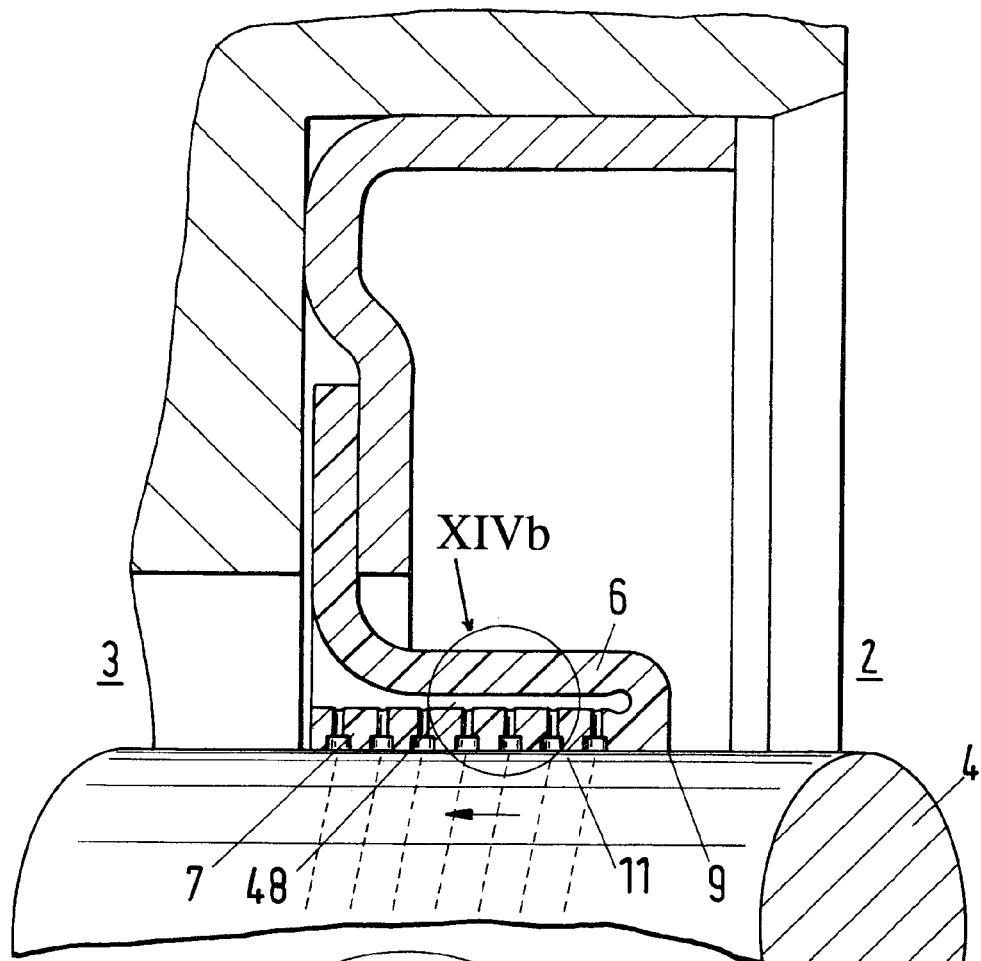
FIG. 14*a* shows a fourteenth embodiment of a sealing ring according to the invention in a representation corresponding to that of FIG. 1.
Figure 14B:
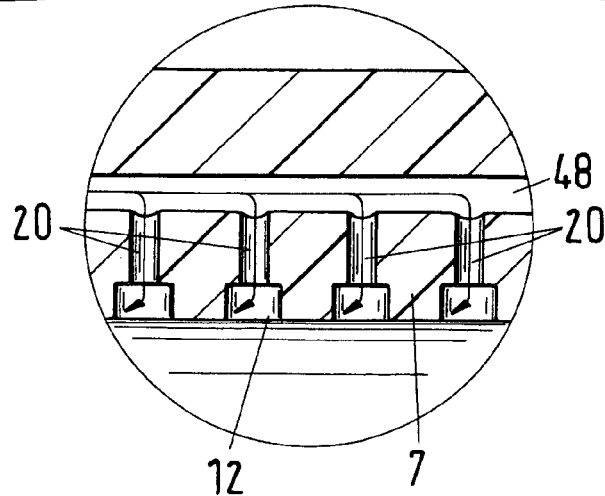
FIG. 14*b* shows detail XIVb of FIG. 14*a*.

The sealing ring according to FIGS. 14a, 14b is substantially identical to that of FIG. 2. The first and second sealing lips 6 and 7 extend approximately parallel to one another wherein the second sealing lip 7 has a return device 12 and at least one secondary sealing edge 9. The sealing lip 7 is somewhat shorter than that of FIG. 2 and has preferably radial intake bores 20 that are spaced preferably at the same axial spacing relative to one another and form a perforation and radially penetrate the sealing lip 7. The bores 20 are uniformly distributed about the length and the circumference of the sealing lip 7. As illustrated in particular in detail A, the bores 20 with one end adjoin the annular chamber 48 between the first sealing lip 6 and the second sealing lip 7, where oil is collected or at least an oil/air mixture is present, and with the other end adjoins at least one return device 12 preferably at a location of the circumference of the thread of the return conveying device 12 that is farthest away from the shaft 4. The individual intake bores 20 must not be arranged in the circumferential direction in an axial or radial plane.

As a result of the strong conveying action of the conveying device 12, without the intake bores 20 an underpressure would be produced between the contact surface 11 and the shaft 4 that would effect a pressure compensation by sucking in air from the air side. By means of the intake bore 20, the under pressure is however compensated by taking in oil or an oil/air mixture from the chamber 48 between the first and the second sealing lips 6 and 7. In this way, a medium flow illustrated by the arrows in the detail view FIG. 14b results that intensively lubricates and cools the contact area 11 of the sealing lip 7 and of the shaft 4. The sealing ring is suitable because of its lubrication system especially for use at high rotary speed.

The sealing ring can advantageously be used also for a pure dry running because air is then pumped in circulation as a cooling agent. Especially in this configuration it is advantageous that the return thread 12 is produced by means of a laser instead, as is conventional, by embossing because, when using a laser, the intake bores 20 and the return thread 12 can be produced in a single working step.

Figure 15:
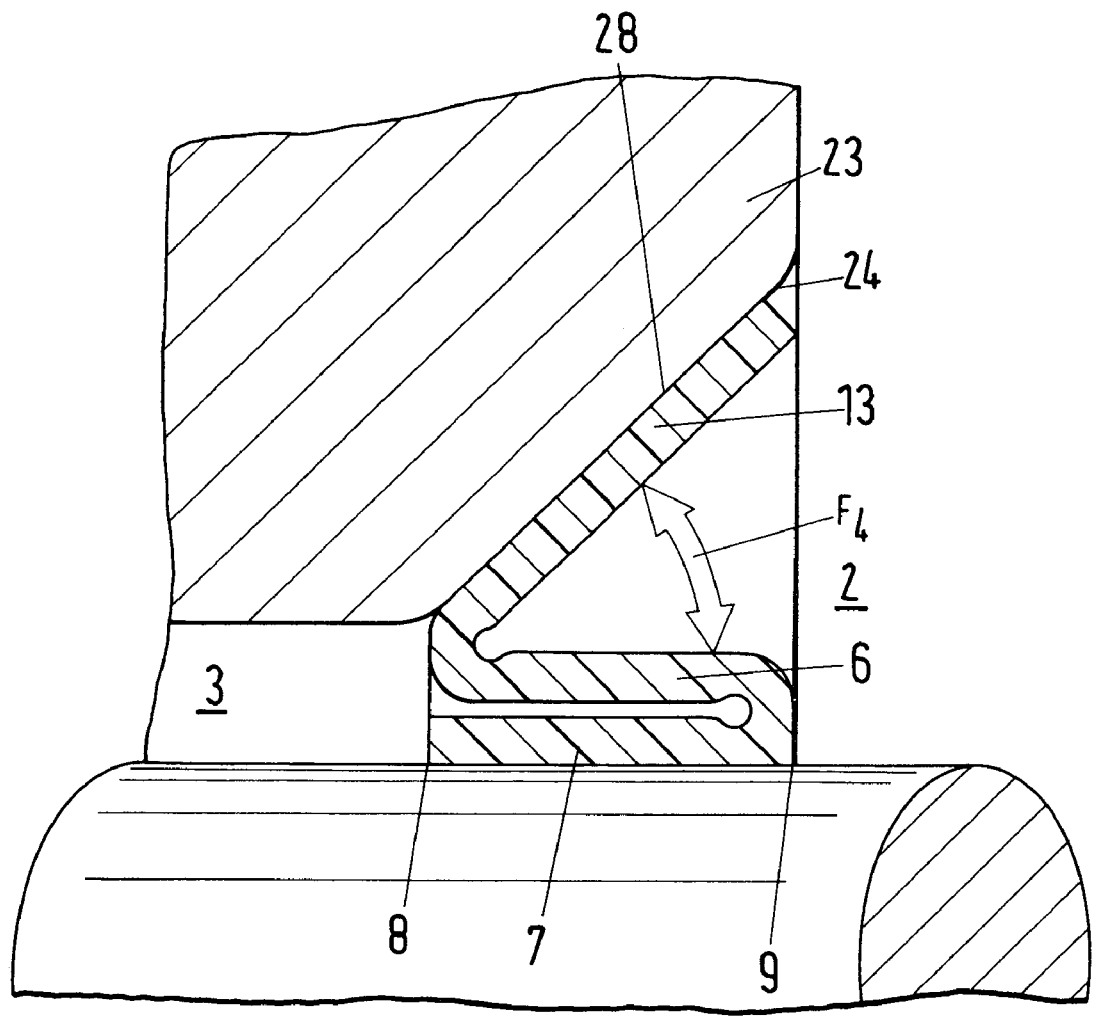
FIG. 15 shows a fifteenth embodiment of a sealing ring according to the invention in a representation corresponding to that of FIG. 1.

In the embodiment according to FIG. 15, the seal is designed similar to that of FIG. 2 but without a seal housing. The sealing disk 1 is attached instead directly to the machine housing or the engine or drive module 23. In the illustrated embodiment, the latter has a receiving cone 24 to which the fastening part 13 of the sealing disk 1 is attached by means of an adhesive connection 28. As in the seal according to FIG. 2, the first and the second sealing lips 6 and 7 have the same length. The second sealing lip 7 has primary and secondary sealing edges 8 and 9 with which it seals against the oil side 3 and the air side 2, respectively. The fastening part 13 is slanted at an acute angle of approximately 45 degrees to the sealing lip 6. A return force $F_4$ acts on the fastening part 13 and the sealing lip 6 which force is the result of the deformation. The fastening part 13 is forced by the restoring force $F_4$ against the receiving cone 24 so that the adhesive connection 28 is reinforced. Moreover, the restoring force assists also the pressing of the second sealing lip 7 against the shaft 4 so that a safe securing action in the housing 23 and a proper sealing of the shaft 4 are ensured.

Figure 16:
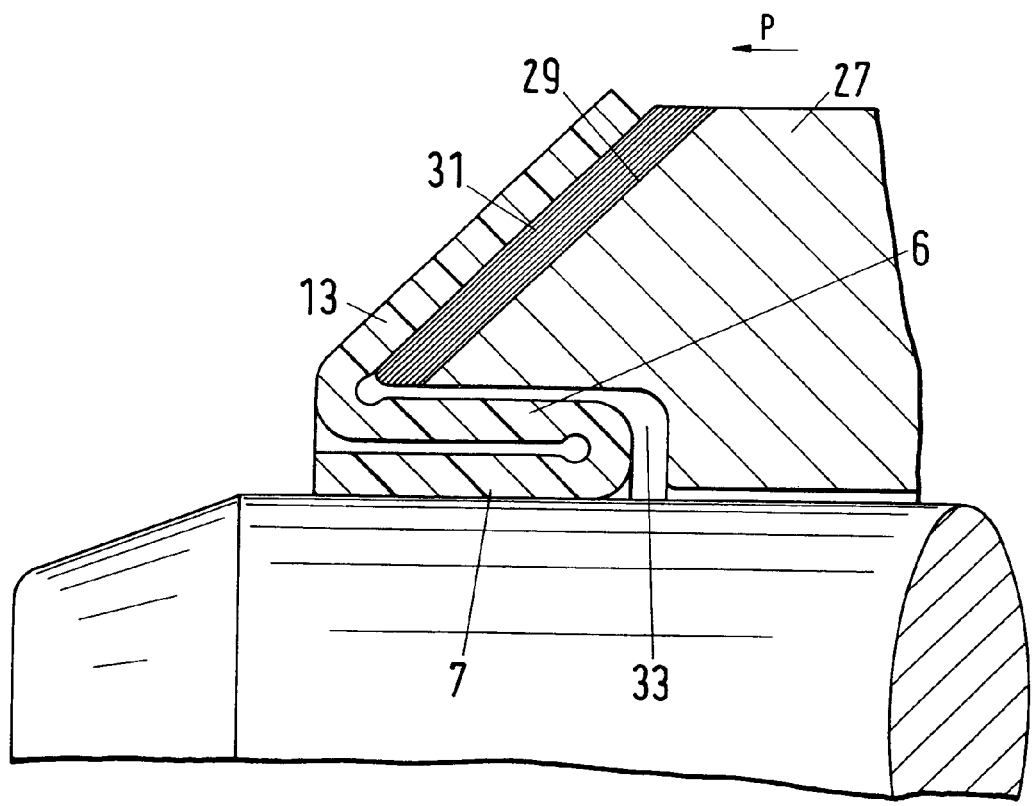
FIG. 16 shows the sealing ring according to FIG. 15 with a pressing or mounting tool which rests with an intermediately positioned support against the sealing ring.
Figure 17:
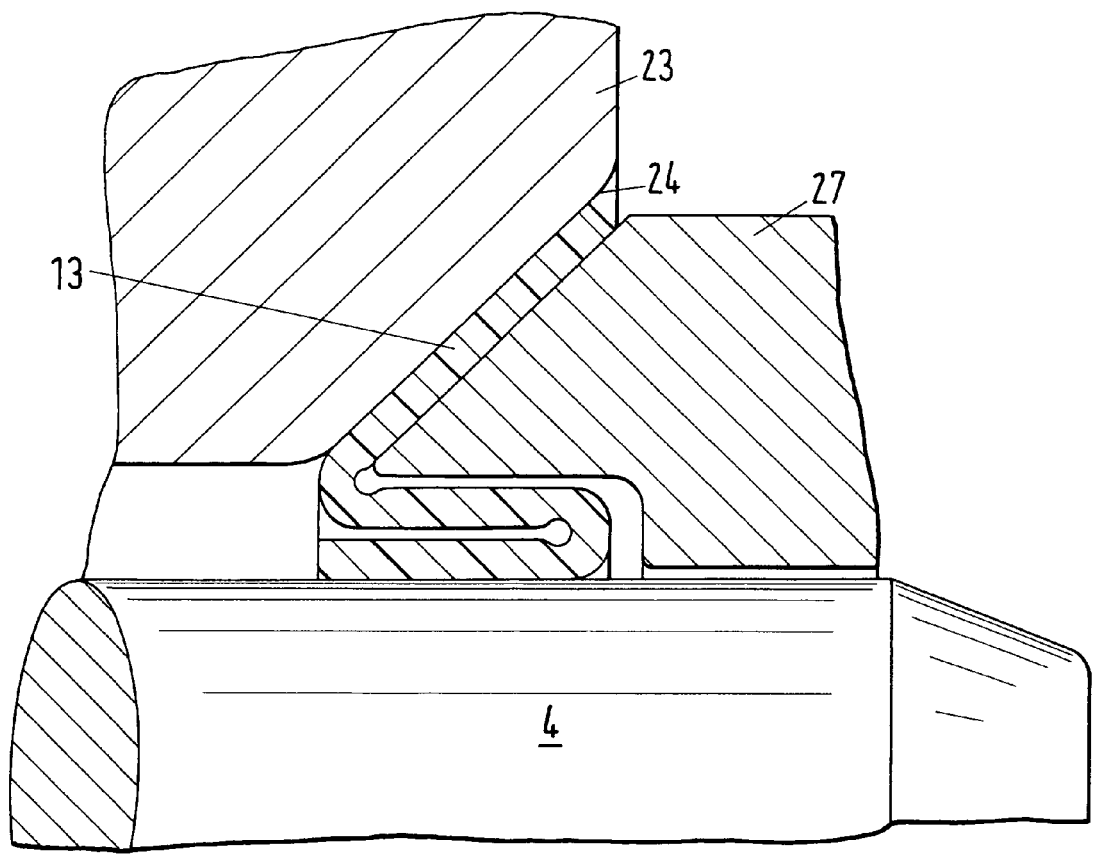
FIG. 17 shows a presentation corresponding to that of FIG. 16 without the support for the tool.
Figure 18:
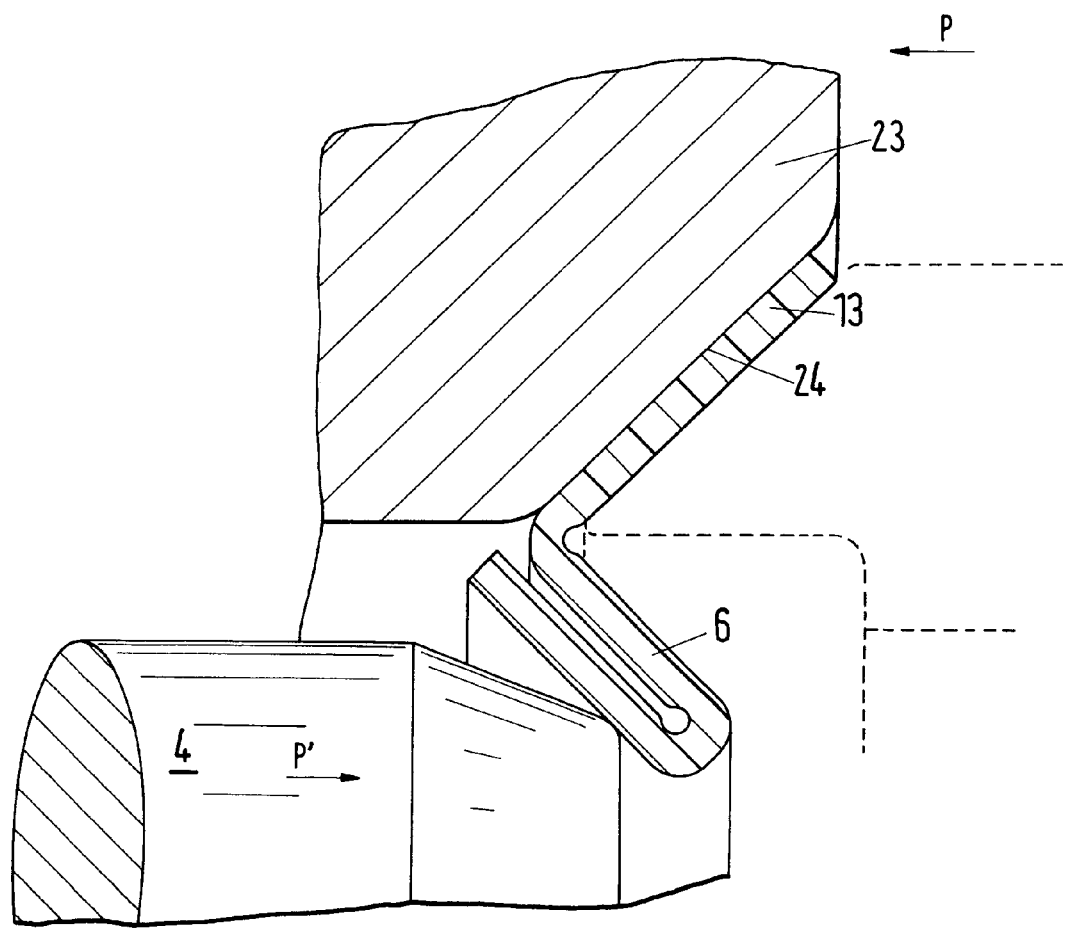
FIG. 18 shows the sealing ring according to FIG. 15 upon being pushed onto a shaft.

As illustrated in FIGS. 16 to 18, the plane sealing disk 1 is moved into its mounting position by a pressing and centering tool 27 (FIG. 16) that has a projection triangular in cross-section and a cutout 33 rectangular in axial section at its inner side. On the sealing disk 1, as illustrated in FIG. 2, the second sealing lip 7 is bent by rolling a part of the sealing disk by 180 degrees until it rests against the first sealing lip 6. The pre-shaped sealing disk is then inserted into the tool 27 such that the two sealing lips 6 and 7 are positioned at the level of the receptacle 33 (FIG. 16). The part of the sealing disk 1 that is not rolled and forms the fasting part 13 is positioned in front of the end face 29 of the tool 27. The sealing disk 1 is moved by the tool 27 in the direction P (FIG. 18) against the housing cone 24 wherein, for compensation of shape deviations of the receiving cone, an elastic support 31 can be provided (FIG. 16) between the fastening part 13 and the cone surface 29 of the tool projection 27 extending in the direction P at a slant downwardly and forwardly. The fasting part 13 is pressed tightly against the housing cone 24 and secured by means of an adhesive connection 28 (FIG. 15). The sealing lips 6 and 7 are positioned initially outside of the receptacle 33 of the tool 27 when the fasting part 26 is pressed into the receptacle 24 (FIG. 18). Subsequently, the shaft 4 is pushed through the housing opening 24 in the direction P' and impinges with a conical end on the bent second sealing lip 7. Upon further pushing of the shaft 4 through the seal, the sealing lips 6 and 7 are elastically bent radially outwardly into the sealing position illustrated in FIGS. 15 through 17. As soon as the seal has been mounted in this way in the housing 23 and on the shaft 4, the mounting tool 27 can be retracted in a direction opposite to the direction P. The tool 27 has a central centering bore 30 whose diameter is somewhat greater than the diameter of the shaft 4. In this way, mounting of the sealing ring is simplified.

Figure 19:
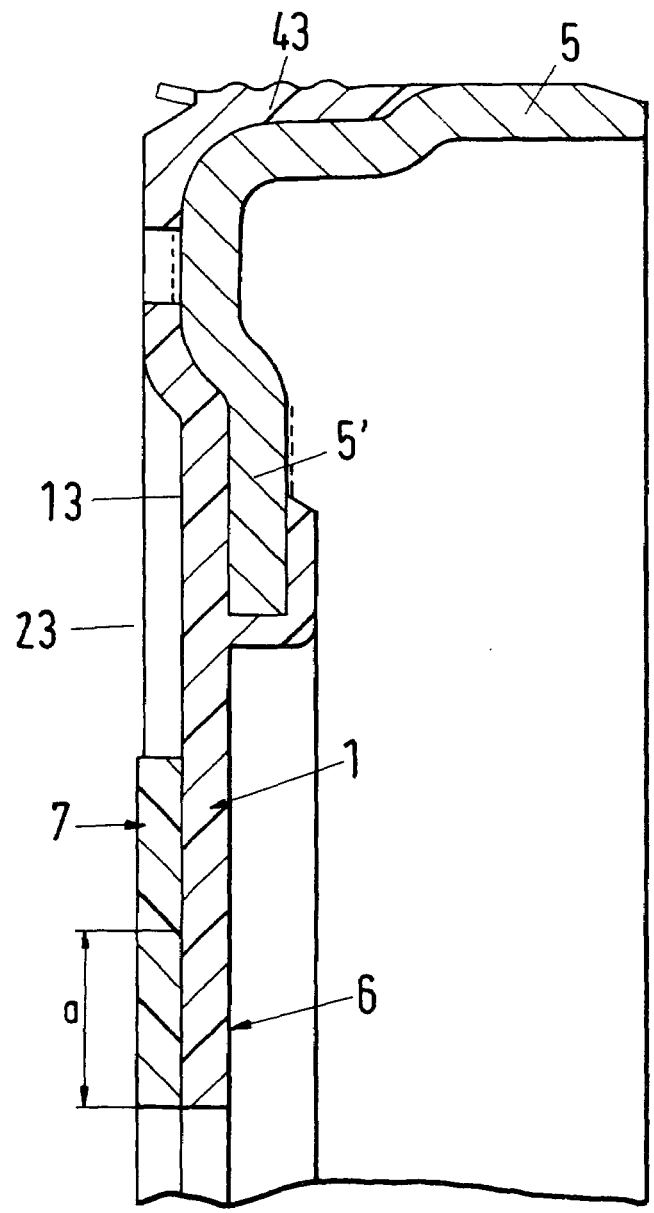
FIG. 19 shows another sealing ring according to the invention in an illustration according to FIG. 1, but the sealing disk is shown in the undeformed state.

In FIGS. 19 to 21, a further sealing ring is illustrated in which in a manner known in the art between the machine housing 23 and the seal housing 5 as well as well as the sealing disk 1 or its fasting part 13 and a radial support part 5' of the seal housing 5 a casing 43 is provided as is known in the art. The sealing disk 1 is comprised of elastomer material. The first sealing lip 6 is formed by an end section of the sealing disk 1 that is curved in axial section to a part-circular shape in the introduction direction P' of the shaft (FIG. 20). The second sealing lip 7 is partially attached to the first sealing lip 6 and is comprised advantageously of the same material, preferably polytetrafluoroethylene, as the second sealing lip 7 in accordance with the above described sealing ring. The second sealing lip 7 is attached only to a free section 44 that is facing away from a seal housing 5 over length a (FIG. 19) to the first sealing lip 6, for example, by an adhesive, by fusing or the like. The first elastic sealing lip 6 projects, as illustrated in FIG. 21, past the free end of the second sealing lip 7 and has a radially extending transverse stay 45 resting against the shaft 4. The second sealing lip 7 rests against the stay 45 with its free edge 17. A relatively short sealing lip section 6' projects past the transverse stay 45 and is slanted inwardly in the direction toward the shaft 4 and toward the air side. In this way a dust lip is formed that rests sealingly on the shaft 4 and that reliably prevents penetration of dust and dirt from the air side 2.

The other section 46 of the sealing lip 7 at the oil side extends to the level of the fasting part 13. With the free sealing lip section 46 that is not attached to the sealing disk 1, the second sealing lip 7 rests sealingly on the shaft 4. As a result of the elastically bent part 6 of the sealing disk 1, the section 46 that faces the oil side rests with elastic pretension against the shaft 4. The free edge 17 of the sealing lip section 46 has a primary sealing edge 8 with which the penetration of oil between the shaft 4 and the second sealing lip 7 can be prevented. This sealing ring is constructively simpler and ensures as a result of the sealing disk 1 being made of elastomer material a shape-elastic suspension of the active sealing lip 7. In this way, it has an excellent radial movability so that it can follow eccentrically supported shafts easily.

Figure 22:
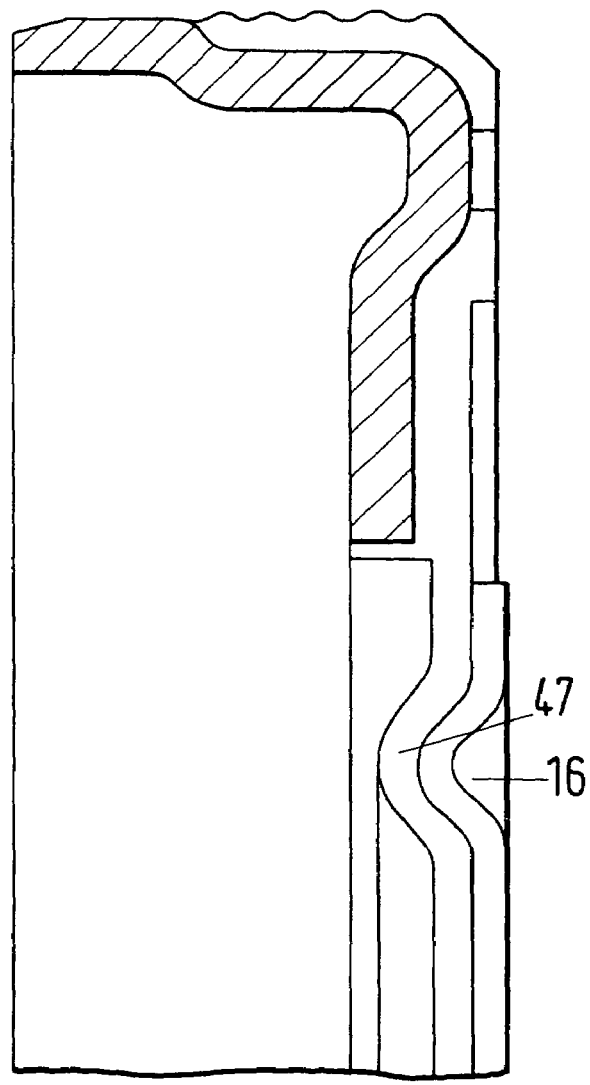
FIG. 22 shows a further sealing ring according to the invention in an illustration according to FIG. 19.

The embodiment according to FIG. 22 differs from the above described sealing ring only in that, similar to the embodiment of FIG. 7, it has a circumferential outwardly curved annular groove 47 curved away from the shaft 4 that provides a lubricant reservoir. The annular groove 47 is formed by a corresponding deformation of the first and second sealing lips 6,7 and is located approximately at half the axial width of the first sealing lip 6. The oil that penetrates from the oil side into the space between the shaft 4 and the second sealing lip 7 can be collected in the reservoir 16 and reduces friction between the parts in this way. In turn, this leads to a reduction of the sealing gap temperature so that the risk of carbon fouling is prevented.

This sealing ring is suitable for use in connection with insufficient lubrication when dry running phases can occur.

The oil reservoir 16 ensures pre-lubrication and thus a better initial running and provides a temporary static sealing means. By means of this integrated lubricant circulation system, the sealing ring is suitable for high rotary speeds and when there is a risk of dry running of the seal.

The described radial shaft seals have the advantage that they can be matched to different operating conditions and applications. They can be used, for example, in connection with known sealing rings where only one sealing lip facing the oil side is provided. In the case of the described seals there is no risk of damage of the sealing lip when mounting the seal on the shaft. The sealing lip 7 can also be visually checked after mounting of the seal on the shaft with regard to proper mounting position. Moreover, no additional dust lip is required because its function is already integrated. Moreover, the sealing rings provide a reduction of the sealing size by at least 50 percent and weight savings in the engine or drive device to be sealed by up to several kilograms.

With the seal according to FIG. 15, weight savings of the seal by 30 percent in comparison to conventional seals with a single sealing lip that is oriented to the air side can be achieved.

With the sealing ring according to FIG. 16, weight savings of the seal by 90 percent in comparison to known sealing rings with a sealing lip facing the air side can be achieved. Also, cost savings for the seal up to 90 percent in comparison to known sealing rings are possible. Finally, in the seal according to FIG. 16 no machining of the seal receptacles is required so that the expensive and precise machining of the seal receptacle is no longer needed.

Also, in the described seals the advantages of those seals are maintained where the sealing lip is facing the oil side. Moreover, the disadvantages of these known seals are prevented. The advantages of the above described seal relative to known seals are the following. The position of the sealing edge relative to the air side and the oil side is freely selectable. A combination of the sealing principles return conveying action and sealing edge is provided. A priority can be set regarding oil sealing action or protective action. The sealing lip does not lift off the shaft when pressure loading occurs so that pressure testing of the engine can be carried out without requiring additional measures and the use of seals is possible also during pressure loading is possible. It is further advantageous that the sealing lip can be pressure-loaded from the oil side as well as air side. Accordingly, the mounting position is freely selectable, and the seal is suitable for separating two pressure chambers.

While specific embodiments of the invention have been shown and described in detail to illustrate the inventive principles, it will be understood that the invention may be embodied otherwise without departing from such principles.

What is claimed is:

1. A sealing ring comprising:
    a sealing disk having a fastening part and a seal part, wherein the fastening part is adapted to be connected to a first stationary machine part and the seal part is adapted to seal a movable machine part and is oriented in an axial direction toward an atmosphere side or a medium side of the sealing ring;
    wherein the seal part comprises a first sealing element and a second sealing element adjoining the first sealing element and oriented in a direction opposite to the first sealing element in a mounted position of the sealing ring;
    wherein the second sealing element is adapted to rest against the rotary machine part under a radial force;
    wherein the first sealing element and the second sealing element extend in the mounted position substantially parallel to one another in the axial direction; and
    wherein the first sealing element is positioned radially outwardly relative to the second sealing element.

2. The sealing ring according to claim 1, wherein the first sealing element rests against the second sealing element in the mounted position.

3. The sealing ring according to claim 1, wherein the first and second sealing elements have identical length.

4. The sealing ring according to claim 1, wherein the second sealing element is shorter than the first sealing element.

5. The sealing ring according to claim 1, wherein the second sealing element is formed by bending a section of the sealing disk by approximately 180degrees.

6. The sealing ring according to claim 1, wherein the second sealing element is formed by removing a portion of the sealing disk.

7. The sealing ring according to claim 1, wherein the second sealing element comprises at least one sealing edge.

8. The sealing ring according to claim 1, wherein the second sealing element has a contact surface adapted to rest against the movable machine part and wherein the contact surface has at least one return device.

9. The sealing ring according to claim 8, wherein the return device is a thread.

10. The sealing ring according to claim 1, wherein the seal part has a third sealing element.

11. The sealing ring according to claim 10, wherein the third sealing element is essentially aligned with the second sealing element in the mounted position.

12. The sealing ring according to claim 10, wherein the sealing disk has a shoulder connecting the first sealing element and the third sealing element, wherein the shoulder extends slantedly outwardly in the mounted position.

13. The sealing ring according to claim 10, wherein the third sealing element adjoins the fastening part.

14. The sealing ring according to claim 10, wherein the third sealing element has a return device.

15. The sealing ring according to claim 10, wherein the third sealing element is oriented toward the medium side.

16. The sealing ring according to claim 10, wherein the third sealing element rests against the second sealing element.

17. The sealing ring according to claim 10, wherein the third sealing element is formed by a convexly curved section of the sealing disk that is curved in a direction toward the movable machine part.

18. The sealing ring according to claim 10, wherein one of the first, second, and third sealing elements delimits an annular chamber provided as a lubricant reservoir.

19. The sealing ring according to claim 10, wherein the second sealing element has at least the same thickness as at least one of the first sealing element and the third sealing element and the fastening part.

20. The sealing ring according to claim 1, comprising at least one lubricant reservoir.

21. The sealing ring according to claim 20, wherein the seal part has a third sealing element, wherein the at least one lubricant reservoir is formed as an intermediate space between the first and third sealing elements.

22. The sealing ring according to claim 20, wherein between the first and second sealing elements an annular chamber is formed, wherein the at least one lubricant reservoir communicates with the annular chamber.

23. The sealing ring according to claim 1, wherein the second sealing element has a primary sealing edge and a secondary sealing edge, wherein the primary sealing edge faces the medium side and the secondary sealing edge faces the atmosphere side.

24. The sealing ring according to claim 1, wherein the sealing disk with the fastening part is adapted to be fastened to a receptacle of the stationary machine part by an adhesive.

25. The sealing ring according to claim 1, wherein the second sealing element has an annular groove projecting radially outwardly toward the first sealing element, wherein the annular groove forms a lubricant reservoir.

26. The sealing ring according to claim 25, wherein the annular groove is arranged approximately at half an axial length of the second sealing element.

27. The sealing ring according to claim 26, wherein the first sealing element rest against an outer wall of the annular groove.

28. The sealing ring according to claim 1, wherein the first sealing element, when viewed in axial section, extends from the fastening part at a slant toward the movable machine part.

29. The sealing ring according to claim 1, wherein the second sealing element has at least one of an end face and a primary sealing edge having a wave shape.

30. The sealing ring according to claim 1, wherein an additional pressing force is provided for pressing the second sealing element against the movable machine part.

31. The sealing ring according to claim 30, comprising at least one spring for providing the additional pressing force.

32. The sealing ring according to claim 31, wherein the at least one spring is an annular spring.

33. The sealing ring according to claim 31, wherein the first sealing element has a groove-shaped receptacle for receiving the at least one spring.

34. The sealing ring according to claim 31, wherein the at least one spring rests against the second sealing element in the mounted position.

35. The sealing ring according to claim 1, wherein the second sealing element has at least partially a greater thickness than the first sealing element.

36. The sealing ring according to claim 1, wherein the second sealing element has a thickness that increases in a direction toward a free end of the second sealing element.

37. The sealing ring according to claim 36, wherein the thickness of the second sealing element increases steadily.

38. The sealing ring according to claim 1, wherein the first sealing element at the medium side rests against a free end of the second sealing element.

39. The sealing ring according to claim 1, wherein the first sealing element is S-shaped in axial section.

40. The sealing ring according to claim 39, wherein the first sealing element has a curved section at the medium side and rests with the curved section on an end of the second sealing element.

41. The sealing ring according to claim 1, wherein the second sealing element has at least one intake bore and a return device, wherein the at least one intake bore connects the medium side to the return device so that a lubricant circulation is provided.

42. The sealing ring according to claim 41, wherein several of the at least one intake bore are provided that are spaced apart from one another.

43. The sealing ring according to claim 42, wherein between the first and second sealing elements an annular chamber is formed, wherein the intake openings connect the annular chamber to the return device.

44. A sealing ring comprising:

a sealing disk having a fastening part and a seal part, wherein the fastening part is adapted to be connected to a first stationary machine part and the seal part is adapted to seal a movable machine part and is oriented in an axial direction toward an atmosphere side or a medium side of the sealing ring;

wherein the sealing part comprises a first seal element and a second sealing element adjoining the first sealing element and oriented in a direction opposite to the first sealing element in a mounted position of the sealing ring;

wherein the second sealing element is adapted to rest against the rotary machine part under a radial force;

wherein the second sealing element has at least one intake bore and a return device, wherein the at least one intake bore connects the medium side to the return device so that a lubricant circulation is provided;

wherein several of the at least one intake bore are provided that are spaced apart from one another;

wherein between the first and second sealing elements an annular chamber is formed, wherein the intake openings connect the annular chamber to the return device;

wherein the return device is a thread.

45. The sealing ring according to claim 44, wherein the intake bores open at a bottom of the thread.

46. The sealing ring according to claim 1, wherein the sealing disk is adapted to be attached by an adhesive connection to a receiving cone of the stationary machine part.

47. The sealing ring according to claim 1, wherein the sealing disk is adapted to be connected by a mounting tool on the stationary machine part.

48. The sealing ring according to claim 47, wherein an elastic support is provided between the fastening part and the mounting tool.

49. The sealing ring according to claim 1, wherein the first and second sealing elements are separate parts.

50. The sealing ring according to claim 49, wherein the first and second sealing elements are comprised of different materials.

51. The sealing ring according to claim 49, wherein the second sealing element is connected with only one end area to the first sealing element.

52. The sealing ring according to claim 49, wherein the first sealing element comprises a dust lip projecting past the second sealing element.

53. The sealing ring according to claim 49, wherein the first and second sealing elements together form an annular groove curved outwardly away from the moveable machine part such that between the movable machine part and the second sealing element a lubricant reservoir is formed.

* * * * *